United States Patent
Maxwell et al.

(10) Patent No.: US 10,561,568 B1
(45) Date of Patent: Feb. 18, 2020

(54) EXOSKELETON SYSTEM PROVIDING FOR A LOAD TRANSFER WHEN A USER IS STANDING AND KNEELING

(71) Applicant: LOCKHEED MARTIN CORPORATION, Bethesda, MD (US)

(72) Inventors: Keith Everett Maxwell, Tampa, FL (US); Patricia Ann Aelker, Longwood, FL (US); Gavin A. Barnes, Saint Cloud, FL (US); Antoine J. Bell, Orlando, FL (US); Robert Brady, Sarasota, FL (US); Erik Holmen, Sarasota, FL (US); Alexander Hussain, Sarasota, FL (US); Joel Chartier, Bradenton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1187 days.

(21) Appl. No.: 14/744,855

(22) Filed: Jun. 19, 2015

Related U.S. Application Data

(60) Provisional application No. 62/014,430, filed on Jun. 19, 2014.

(51) Int. Cl.
*A61H 3/00* (2006.01)

(52) U.S. Cl.
CPC ....... *A61H 3/008* (2013.01); *A61H 2003/007* (2013.01); *A61H 2201/1652* (2013.01); *A61H 2203/0406* (2013.01)

(58) Field of Classification Search
CPC .............. A61H 3/008; A61H 2003/007; A61H 1/0237; A61H 1/0244; A61H 3/00;
(Continued)

(56) References Cited

U.S. PATENT DOCUMENTS

| 2,010,482 A | 8/1935 | Cobb |
| 3,964,182 A | 6/1976 | Pomeret et al. |

(Continued)

FOREIGN PATENT DOCUMENTS

| JP | H03105191 U | 10/1991 |
| JP | 3024978 U | 6/1996 |

(Continued)

OTHER PUBLICATIONS

Advisory Action and AFCP 2.0 Decision for U.S. Appl. No. 15/181,934, dated Jan. 9, 2019, 4 pages.
(Continued)

*Primary Examiner* — Quang D Thanh
(74) *Attorney, Agent, or Firm* — Withrow & Terranova, PLLC

(57) ABSTRACT

A counterbalance system for an exoskeleton is provided, including a first hip joint to displace an external load experienced by a user above a waist of the user, the first hip joint provides for three degrees of freedom of movement, a tool interface located above the first hip joint to direct load displacement through the first hip joint, and a counterbalance arm having a first end and a second end, the counterbalance arm is secured to the tool interface at the first end, the second end of the counterbalance arm is moveable in an arcuate rotational path ranging from in front of the tool interface to behind the tool interface. Another system and method are also provided.

18 Claims, 28 Drawing Sheets

(58) Field of Classification Search
CPC .... A61H 2201/0157; A61H 2201/1623; A61H 2201/1626; A61H 2201/1628; A61H 2201/163; A61H 2201/1652; A61H 2203/0406; A61H 2205/08; A61H 2205/081; A61H 2205/088; A61H 2205/102

See application file for complete search history.

(56) References Cited

U.S. PATENT DOCUMENTS

| | | | |
|---|---|---|---|
| 4,258,556 | A | 3/1981 | Ruyten et al. |
| 5,016,869 | A | 5/1991 | Dick et al. |
| 5,020,790 | A | 6/1991 | Beard et al. |
| 5,054,476 | A | 10/1991 | Petrofsky et al. |
| 5,476,441 | A | 12/1995 | Durfee et al. |
| 5,865,426 | A | 2/1999 | Kazerooni |
| 5,954,677 | A | 9/1999 | Albrecht et al. |
| 5,993,404 | A | 11/1999 | McNiel |
| 6,039,707 | A | 3/2000 | Crawford et al. |
| 6,886,812 | B2 | 5/2005 | Kazerooni |
| 6,913,583 | B2 | 7/2005 | Jestrabek-Hart |
| 7,153,242 | B2 | 12/2006 | Goffer et al. |
| 7,163,518 | B1 | 1/2007 | Roche et al. |
| 7,571,839 | B2 | 8/2009 | Chu et al. |
| 7,628,766 | B1 | 12/2009 | Kazerooni et al. |
| 7,883,546 | B2 | 2/2011 | Kazerooni et al. |
| 7,947,004 | B2 | 5/2011 | Kazerooni et al. |
| 8,057,410 | B2 | 11/2011 | Angold et al. |
| 8,070,700 | B2 | 12/2011 | Kazerooni et al. |
| 8,171,570 | B2 | 5/2012 | Adarrage |
| 8,231,688 | B2 | 7/2012 | Fairbanks et al. |
| 8,257,291 | B2 | 9/2012 | Kazerooni et al. |
| 8,394,038 | B2 | 3/2013 | Ashihara et al. |
| 8,672,865 | B2 | 3/2014 | Franke et al. |
| 8,702,632 | B2 | 4/2014 | Han et al. |
| 8,801,641 | B2 | 8/2014 | Kazerooni et al. |
| 8,894,592 | B2 | 11/2014 | Amundson et al. |
| 8,945,028 | B2 | 2/2015 | Kazerooni et al. |
| 8,968,222 | B2 | 3/2015 | Kazerooni et al. |
| 9,011,354 | B2 | 4/2015 | Angold et al. |
| 9,492,300 | B2 | 11/2016 | Bujold et al. |
| 9,662,262 | B2 | 5/2017 | Hollander et al. |
| 9,808,073 | B1 * | 11/2017 | Maxwell ................ B25J 9/0006 |
| 2003/0062241 | A1 | 4/2003 | Irby et al. |
| 2003/0073552 | A1 | 4/2003 | Knight |
| 2003/0093018 | A1 | 5/2003 | Albrecht et al. |
| 2003/0109817 | A1 | 6/2003 | Berl |
| 2003/0115954 | A1 | 6/2003 | Zemlyakov et al. |
| 2004/0237351 | A1 | 12/2004 | Howell |
| 2005/0137717 | A1 | 6/2005 | Gramnas et al. |
| 2006/0064047 | A1 | 3/2006 | Shimada et al. |
| 2006/0107433 | A1 | 5/2006 | Olson |
| 2006/0260620 | A1 | 11/2006 | Kazerooni et al. |
| 2007/0056592 | A1 | 3/2007 | Angold et al. |
| 2007/0123997 | A1 | 5/2007 | Herr et al. |
| 2007/0233279 | A1 | 10/2007 | Kazerooni et al. |
| 2008/0234608 | A1 | 9/2008 | Sankai |
| 2009/0210093 | A1 | 8/2009 | Jacobsen et al. |
| 2009/0292369 | A1 | 11/2009 | Kazerooni et al. |
| 2010/0076360 | A1 | 3/2010 | Shimada et al. |
| 2010/0094185 | A1 | 4/2010 | Amundson et al. |
| 2010/0152630 | A1 | 6/2010 | Matsuoka et al. |
| 2010/0210980 | A1 | 8/2010 | Kudoh |
| 2010/0254696 | A1 | 10/2010 | McKay |
| 2010/0324699 | A1 | 12/2010 | Herr et al. |
| 2011/0040216 | A1 | 2/2011 | Herr et al. |
| 2011/0105966 | A1 | 5/2011 | Kazerooni et al. |
| 2011/0166489 | A1 | 7/2011 | Angold et al. |
| 2011/0201978 | A1 | 8/2011 | Jeon et al. |
| 2011/0214524 | A1 | 9/2011 | Jacobsen et al. |
| 2011/0264014 | A1 * | 10/2011 | Angold ................ B25J 9/0006 601/35 |
| 2011/0266323 | A1 * | 11/2011 | Kazerooni ............ B25J 9/0006 224/575 |
| 2012/0004736 | A1 | 1/2012 | Goldfarb et al. |
| 2012/0073165 | A1 | 3/2012 | McKeown |
| 2012/0172770 | A1 | 7/2012 | Almesfer et al. |
| 2012/0192461 | A1 | 8/2012 | Backus |
| 2012/0283845 | A1 | 11/2012 | Herr et al. |
| 2012/0292361 | A1 | 11/2012 | Thiruppathi |
| 2013/0023800 | A1 | 1/2013 | Bedard et al. |
| 2013/0102935 | A1 | 4/2013 | Kazerooni et al. |
| 2013/0150980 | A1 | 7/2013 | Swift et al. |
| 2013/0197408 | A1 | 8/2013 | Goldfarb et al. |
| 2013/0231595 | A1 | 9/2013 | Zoss et al. |
| 2013/0237884 | A1 | 9/2013 | Kazerooni et al. |
| 2013/0296746 | A1 | 11/2013 | Herr et al. |
| 2013/0303950 | A1 * | 11/2013 | Angold ................ B25J 9/0006 601/35 |
| 2013/0331744 | A1 | 12/2013 | Kamon |
| 2014/0001222 | A1 * | 1/2014 | Vierthaler ............. A45F 3/08 224/653 |
| 2014/0046234 | A1 | 2/2014 | DeSousa |
| 2014/0094729 | A1 | 4/2014 | Lachance et al. |
| 2014/0200491 | A1 | 7/2014 | Julin et al. |
| 2014/0207017 | A1 | 7/2014 | Gilmore et al. |
| 2014/0276264 | A1 | 9/2014 | Caires et al. |
| 2014/0330431 | A1 | 11/2014 | Hollander et al. |
| 2014/0358053 | A1 | 12/2014 | Triolo et al. |
| 2015/0001269 | A1 * | 1/2015 | Sacksteder ........... B25J 9/0006 224/576 |
| 2015/0081036 | A1 | 3/2015 | Nakanishi et al. |
| 2015/0134080 | A1 | 5/2015 | Roh |
| 2015/0173992 | A1 | 6/2015 | Wang |
| 2015/0272501 | A1 | 10/2015 | MacEachern et al. |
| 2015/0272809 | A1 | 10/2015 | Accoto et al. |
| 2015/0313786 | A1 | 11/2015 | Sano |
| 2015/0321340 | A1 | 11/2015 | Smith |
| 2015/0366694 | A1 | 12/2015 | Bujold et al. |
| 2016/0015589 | A1 | 1/2016 | Lee et al. |
| 2016/0016307 | A1 | 1/2016 | Choi et al. |
| 2016/0038313 | A1 | 2/2016 | Kim et al. |
| 2016/0038371 | A1 * | 2/2016 | Sandler ................. A61H 3/00 602/19 |
| 2016/0058647 | A1 | 3/2016 | Maddry |
| 2016/0067550 | A1 | 3/2016 | Breach et al. |
| 2016/0184165 | A1 | 6/2016 | Ohta et al. |
| 2016/0262969 | A1 | 9/2016 | Ohta et al. |
| 2017/0014297 | A1 | 1/2017 | Grygorowicz et al. |
| 2017/0061828 | A1 | 3/2017 | Artemiadis et al. |
| 2017/0181917 | A1 | 6/2017 | Ohta et al. |
| 2017/0303849 | A1 | 10/2017 | De Sapio et al. |

FOREIGN PATENT DOCUMENTS

| | | |
|---|---|---|
| JP | 2003104682 A | 4/2003 |
| JP | 200911818 A | 1/2009 |
| KR | 101570679 B1 | 11/2015 |
| WO | 2012154580 | 11/2012 |
| WO | 2013116900 A1 | 8/2013 |
| WO | 2014125387 A2 | 8/2014 |
| WO | 2014159608 A1 | 10/2014 |
| WO | 2016029159 A2 | 2/2016 |
| WO | 2017025363 A1 | 2/2017 |

OTHER PUBLICATIONS

Non-Final Office Action for U.S. Appl. No. 15/181,934, dated Feb. 26, 2019, 23 pages.
Partial Supplementary European Search Report for European Patent Application No. 16828290.3, dated Mar. 1, 2019, 12 pages.
International Search Report and Written Opinion for International Patent Application No. PCT/US2018/048517, dated Dec. 31, 2018, 13 pages.
Artemiadis, Panagiotis K. et al., "EMG-based Position and Force Estimates in Coupled Human-Robot Systems: Towards EMG-controlled Exoskeletons," Experimental Robotics: The Eleventh International Symposium (book), vol. 54, 2009, Springer Berlin Heidelberg, pp. 1-10.

(56) References Cited

OTHER PUBLICATIONS

Ferris, Daniel P. et al., "An Ankle-Foot Orthosis Powered by Artificial Muscles," Journal of Applied Biomechanics, vol. 21, Issue 2, May 2005, Human Kinetics, Inc., 3 pages.
Ferris, Dan et al., "An Improved Ankle-Foot Orthosis Powered by Artificial Pneumatic Muscles," XIXth Congress of the International Society of Biomechanics: the human body in motion, Jul. 6-11, 2003, Dunedin, New Zealand, University of Otago, 17 pages.
Ferris, Daniel P. et al., "Development of a myoelectrically controlled lower limb orthosis for human locomotion," Proceedings of the NCMRR Symposium "Medical Rehab on the Move: Spotlight on BioEngineering," Abstract, Jan. 4-5, 2001, Bethesda, Maryland, Supported by NIH AR08602 and U.S. Dept. of Veterans Affairs Center Grant #A0806C, 2 pages.
Gordon, Keith E. et al., "Motor Adaptation During Walking with a Powered Ankle Foot Orthosis," Journal of NeuroEngineering and Rehabilitation, vol. 4, 2007, BioMed Central Ltd, 2 pages.
Kawamoto, Hiroaki et al., "Power Assist Method for HAL-3 using EMG-based Feedback Controller," IEEE International Conference on Systems, Man and Cybernetics, Oct. 8, 2003, IEEE, pp. 1648-1653.
Sawicki, Gregory S. et al., "A Knee-Ankle-Foot Orthosis (KAFO) Powered by Artificial Pneumatic Muscles," XIXth Congress of the International Society of Biomechanics: the human body in motion, Jul. 6-11, 2003, Dunedin, New Zealand, 1 page.
Sawicki, Gregory S. et al., "Mechanics and energetics of level walking with powered ankle exoskeletons," The Journal of Experimental Biology, vol. 211, Feb. 19, 2009, The Company of Biologists, pp. 1402-1413.
Non-Final Office Action and Examiner-Initiated Interview Summary for U.S. Appl. No. 14/744,892, dated Feb. 17, 2017, 44 pages.
Notice of Allowance and Notice Requiring Inventor's Oath or Declaration for U.S. Appl. No. 14/744,892, dated Jul. 5, 2017, 11 pages.
Corrected Notice of Allowance for U.S. Appl. No. 14/744,892, dated Jul. 14, 2017, 7 pages.
Non-Final Office Action for U.S. Appl. No. 15/181,934, dated Mar. 27, 2018, 17 pages.
International Preliminary Report on Patentability for PCT/US2016/042427, dated Jan. 23, 2018, 13 pages.
Non-Final Office Action for U.S. Appl. No. 14/801,941, dated Apr. 25, 2018, 9 pages.
International Search Report and Written Opinion for International Patent Application No. PCT/US2016/042427, dated Oct. 24, 2016, 18 pages.
Supplemental Notice of Allowability for U.S. Appl. No. 13/084,265, dated Jan. 25, 2016, 3 pages.
Notice of Reasons for Refusal for Japanese Patent Application No. 2013-504019, dated Dec. 22, 2015, 6 pages.
Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.
Non-Final Office Action for U.S. Appl. No. 13/084,265, dated Sep. 10, 2015, 7 pages.
Extended European Search Report for European Patent Application No. 11766862.4, dated May 27, 2014, 4 pages.
Notice of Reasons for Refusal for Japanese Patent Application No. 2013-504019, dated Feb. 24, 2015, 6 pages.
International Search Report for PCT/US2011/031956, dated Jun. 21, 2011, 2 pages.
International Preliminary Report on Patentability for PCT/US2011/031956, dated Oct. 9, 2012, 6 pages.
Final Office Action for U.S. Appl. No. 15/181,934, dated Oct. 31, 2018, 22 pages.
Non-Final Office Action for U.S. Appl. No. 15/359,806, dated Nov. 16, 2018, 12 pages.
Notice of Allowance for U.S. Appl. No. 14/801,941, dated Sep. 19, 2018, 8 pages.
Notice of Allowance for U.S. Appl. No. 15/371,709, dated Jul. 13, 2018, 10 pages.
International Search Report and Written Opinion for International Patent Application No. PCT/US2018/032940, dated Sep. 12, 2018, 17 pages.
Decision to Grant for Japanese Patent Application No. 2013-504019, dated Aug. 16, 2016, 6 pages.
Written Opinion for Singaporean Patent Application No. 11201800019U, dated Mar. 12, 2019, 7 pages.
Non-Final Office Action for U.S. Appl. No. 15/597,213, dated Apr. 30, 2019, 10 pages.
Interview Summary for U.S. Appl. No. 15/181,934, dated Apr. 12, 2019, 11 pages.
Final Office Action for U.S. Appl. No. 15/359,806, dated May 31, 2019, 14 pages.
Extended European Search Report for European Patent Application No. 16828290.3, dated Aug. 14, 2019, 11 pages.
Notice of Allowance for U.S. Appl. No. 15/597,213, dated Aug. 15, 2019, 7 pages.
Notice of Allowance and Examiner-Initiated Interview Summary for U.S. Appl. No. 15/181,934, dated Jul 16, 2019, 17 pages.

\* cited by examiner

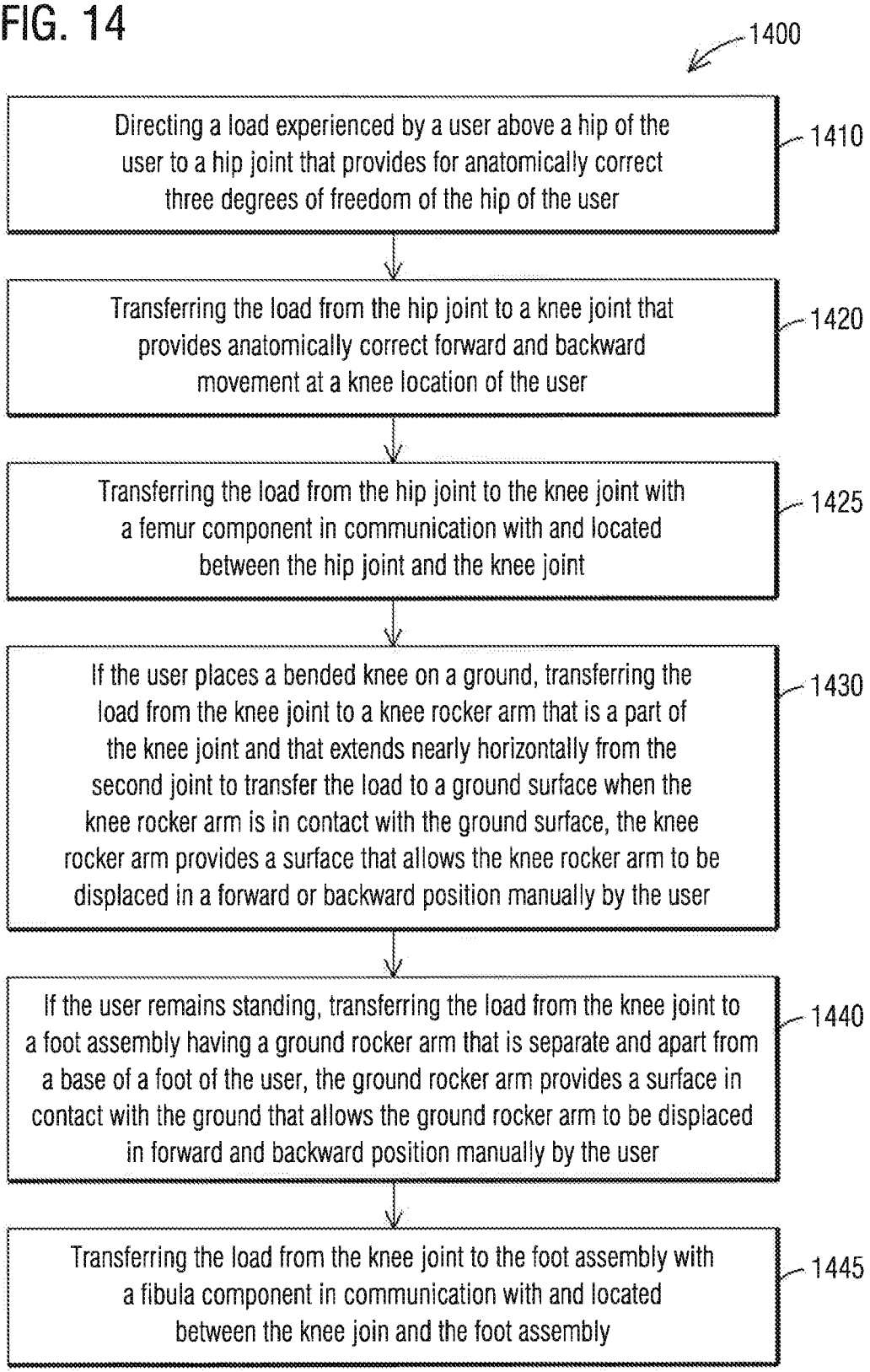

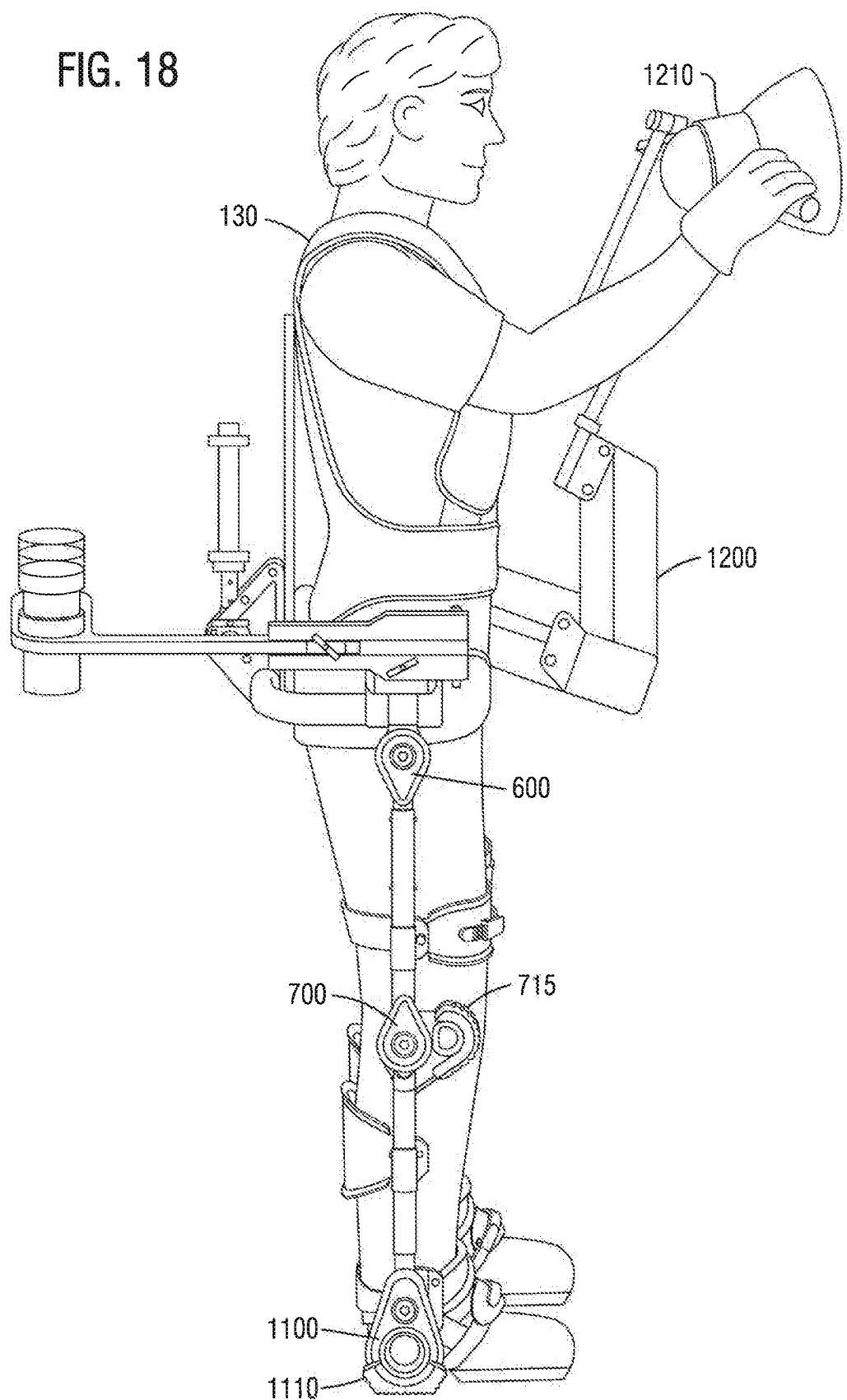

EXOSKELETON SYSTEM PROVIDING FOR A LOAD TRANSFER WHEN A USER IS STANDING AND KNEELING

CROSS-REFERENCE TO RELATED APPLICATIONS

This application claims the benefit of U.S. Provisional Application No. 62/014,430 filed Jun. 19, 2014, and incorporated herein by reference in its entirety.

BACKGROUND

Embodiments relate to an exoskeleton and, more particularly, to a lower body exoskeleton augmentation system that transfers an external load through the exoskeleton structure to the ground, thereby reducing or eliminating the load on the user.

Exoskeletons are known to augment the strength and stamina of users of the exoskeleton by reducing the load felt by the user while wearing an exoskeleton. Powered exoskeletons and unpowered exoskeletons are known. Powered exoskeleton can provide for assistance with walking, running, lifting and other activities where adding power at a human joint increases strength or speed or reduces metabolic cost of the user. Powered exoskeletons respond to user movement by actuating exoskeleton joints to move; the same is not true with unpowered exoskeletons. Powered exoskeletons require a power source, sensors, a computer, and actuators to make the exoskeleton perceive the movement desired by the human, determine which actuators need to actuate over a given range and duration to achieve the desired task.

Unpowered exoskeleton systems are usually lighter in weight and agile enough to allow a user to move under their own power. Current unpowered exoskeletons may be lightweight enough to allow the user to move under their own power, but they are generally designed where a load transfer does not occur for all activities such as, but not limited to, walking, standing, and kneeling, the user may take while wearing the unpowered exoskeleton and handling an external load. As a non-limiting example, with the user of a prior art exoskeleton device takes a knee, the exoskeleton no longer supports the weight load on the system. When kneeling, the load path goes through the user, negating the utility of the exoskeleton. Furthermore, the load going through the user is concentrated on the knee(s) of the user which are in contact with the ground. This may potentially cause injury to the user.

Additionally, current unpowered exoskeleton systems are not designed to move in all directions that a user may desire to move the user's legs.

Users of exoskeletons would benefit from an exoskeleton which provides for load transfer of an external weight being handled by the user wearing the exoskeleton when the user is walking, standing or kneeling.

SUMMARY

Embodiments relate to a system and method for transferring an external load through an exoskeleton structure to the ground and having a counterbalance system to balance a front load experienced by the exoskeleton structure, thereby reducing or eliminating the load on the user.

The system is for a counterbalance system for an exoskeleton comprising a counterbalance arm having a first end and a second end, the counterbalance arm is secured to the exoskeleton at the first end, the second end of the counterbalance arm is moveable in an arcuate rotational path ranging from in front of the exoskeleton to behind the exoskeleton.

Another counterbalance system comprises a first hip joint, providing for three degrees of freedom, to displace a first external load predominantly experienced above the first hip joint on a side of the exoskeleton that the first hip joint is located. The system also comprises a second hip joint, providing for three degrees of freedom, to displace a second external load predominately experienced above the second hip joint on a side of the exoskeleton that the second hip joint is located. The system further comprises a first tool interface located above the first hip joint to direct load displacement through the first hip joint, and a second tool interface located above the second hip joint to direct load displacement through the second hip joint when a tool is attached. The system also comprise a counterbalance arm having a first end and a second end, the counterbalance arm is attached to the first tool interface at the first end, the second end of counterbalance arm is moveable in an arcuate rotational path from in front of the first tool interface to behind the first tool interface.

The method comprises locating a counterbalance arm attached to a first side of an exoskeleton at a location to counterbalance a load from a tool attached to a second side of the exoskeleton. The method also comprises transferring a load resulting from the counterbalance arm primarily to a first hip joint of the exoskeleton located on the first side of the exoskeleton and secondarily to a second hip joint of the exoskeleton located on the second side of the exoskeleton. The method further comprises transferring a load resulting from the tool primarily to the second hip joint and secondarily to the second hip joint.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 14 shows flowchart illustrating an embodiment of a method disclosed herein;

FIG. 18 shows an embodiment of the system disclosed herein in use.

DETAILED DESCRIPTION

Figure 1:
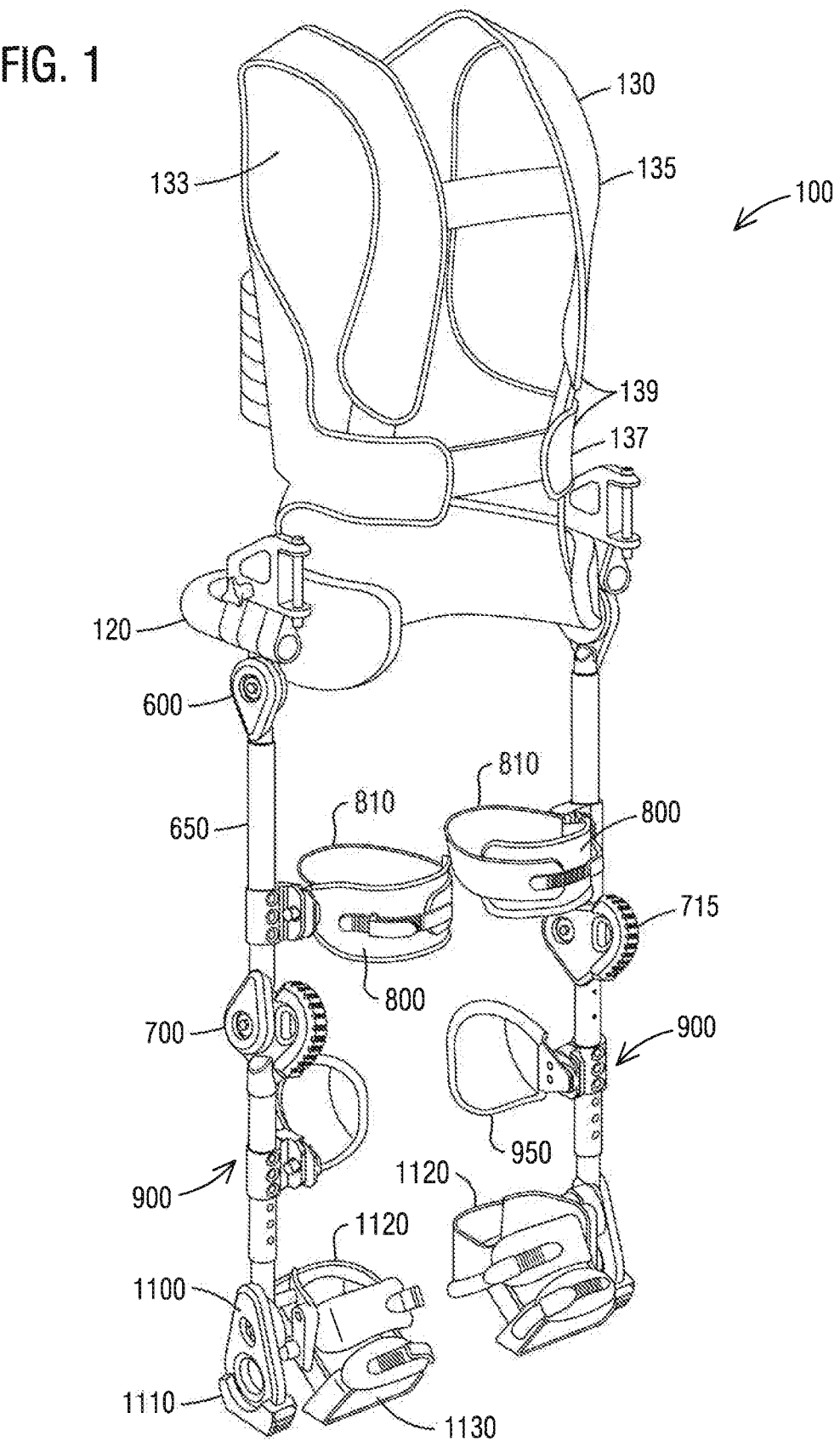
FIG. 1 shows a front perspective view of a lower body exoskeleton augmentation system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 2:
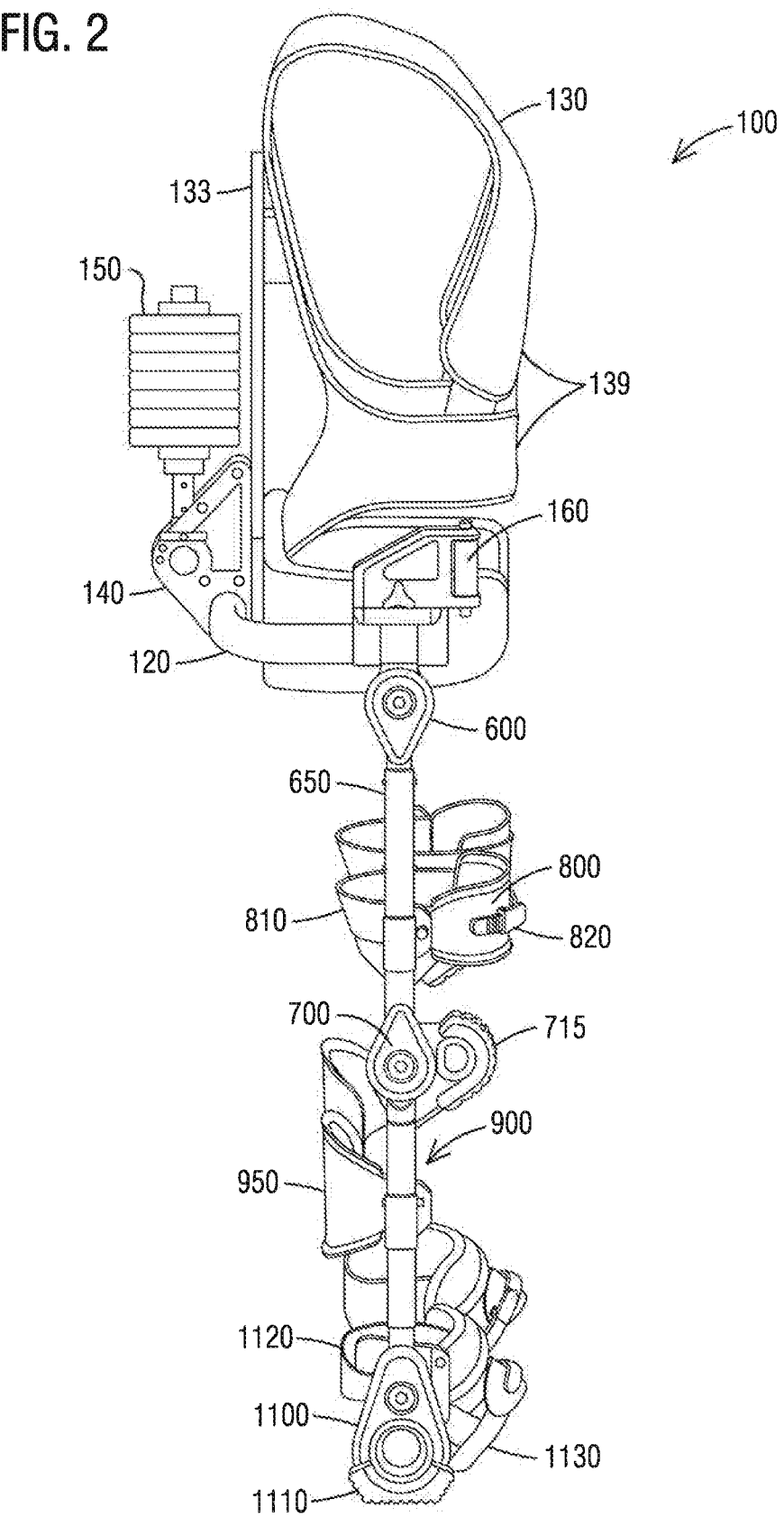
FIG. 2 shows a side perspective view of the lower body exoskeleton augmentation system.
Figure 3:
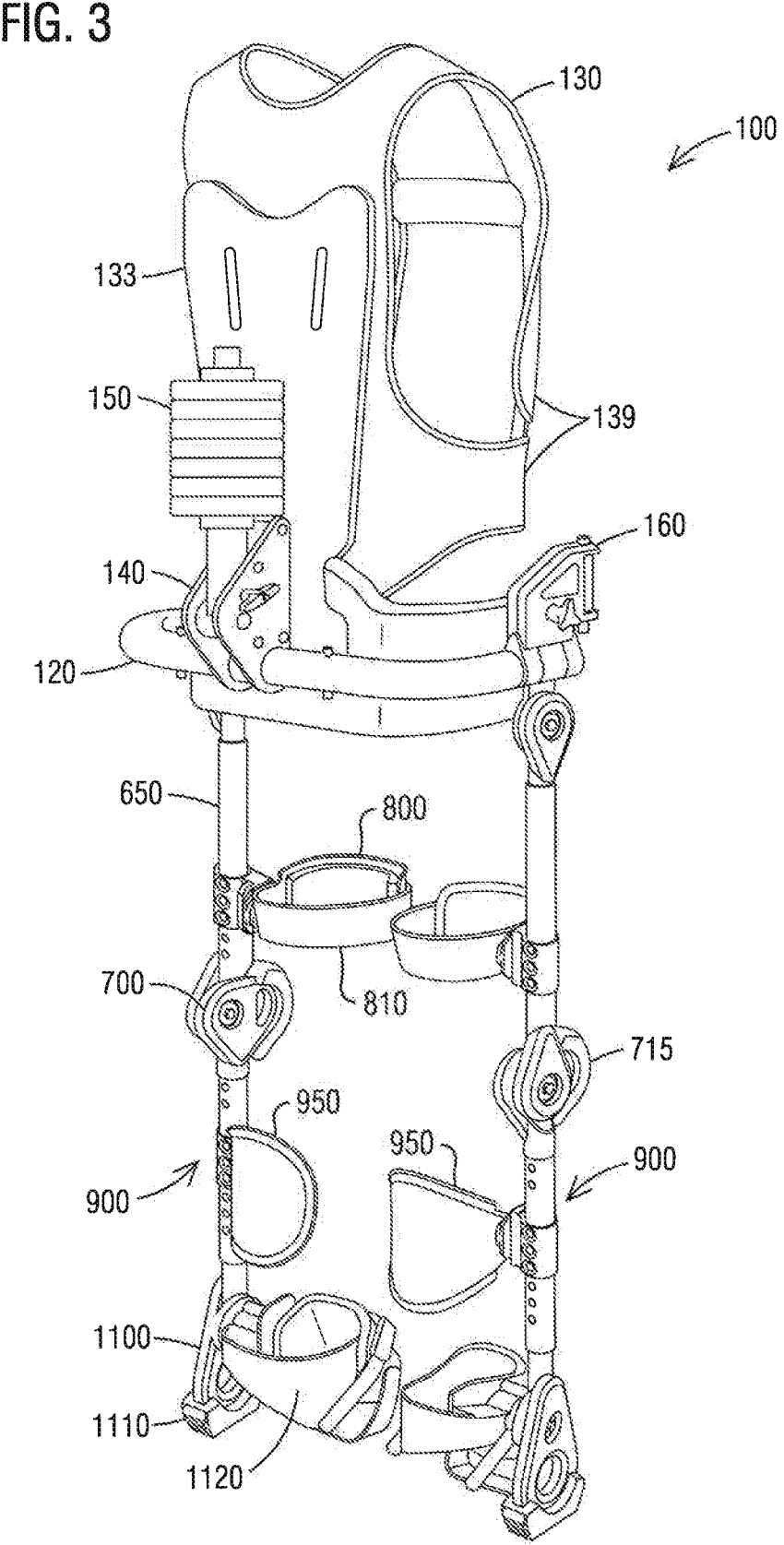
FIG. 3 shows a back perspective view of the lower body exoskeleton augmentation system.

FIGS. 1-3 illustrate perspective views of a lower body exoskeleton augmentation system. An outline of a user is included. The system 100 is configured to transfer loads through the exoskeleton system 100 to off-load the user from experiencing a weight of the load on the body of the user when within the exoskeleton. The load may be transferred through a support extension bar, or hip arc 120, to the rest of the lower body exoskeleton system. To provide for the exoskeleton system 100 to move with the user so that there is no lag felt by the user while wearing the exoskeleton system 100, the components of the exoskeleton may be constructed of lightweight material, such as, but not limited to, a lightweight metal.

As illustrated further in FIGS. 1-3, a harness 130 is provided. The harness 130 may be worn by the user on the upper body to support the lower body exoskeleton system 10. The harness 130 may comprise a back support 133. Upper straps 135 may be attached to the back support 133 and are configured to extend from the back support 133 over the shoulders of the user to lower straps 137 that are placed over a lower torso of the user. The upper straps 135 may be configured to engage with the lower straps 137. As a non-limiting example, an upper strap and lower strap combination 139 may be provided for each shoulder of the user. To accommodate different sized users, at least one of the upper strap 135 and the lower strap 137, on each side, may comprise a mechanism (not shown) to adjust a length of at least one of the upper strap 135 and the lower strap 137 to a length appropriate for the physical dimensions of the user.

A torso assembly or subsystem 140, illustrated in FIGS. 2 and 3, may be a part of or connected to a back part of the harness 130. As explained further below, the torso assembly subsystem 140 may comprise a counter weight component 150 configured to keep the exoskeleton system 100 aligned with the user. A hip arc 120 may extend from both sides of the torso assembly subsystem 140 towards the sides of the user. A hip joint 600 may extend from the hip arc 120 and may be located beside a hip of the user such as, but not limited to, in a same transverse plane and transverse axis of the hip of the user. A tool connector 160, holder or attachment, may be provided on the hip arc 120 or above, or as a part of, the hip joint 600, to which a zero gravity arm 1200 (illustrated in FIG. 12) may be attached. When the zero gravity arm 1200 is attached to the tool connector 160 and a load (not shown) is held by the arm 1200, the torso assembly 140, specifically the counterweight component 150, prevents the load from generally pulling the exoskeleton system 100 in an upward direction.

Figure 4A:
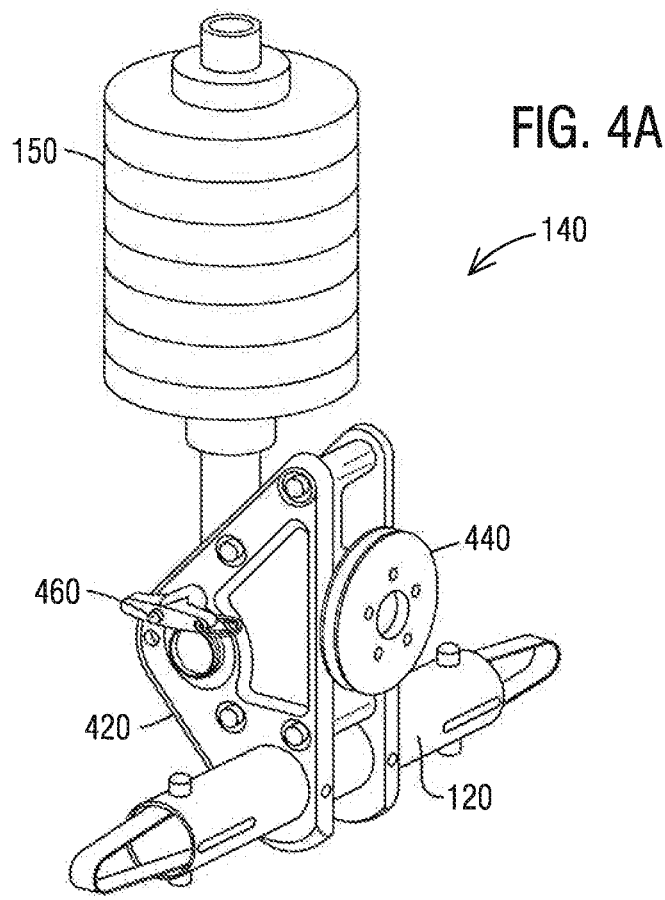
FIGS. 4A-4E show different views and embodiments of a torso assembly.
Figure 4B:
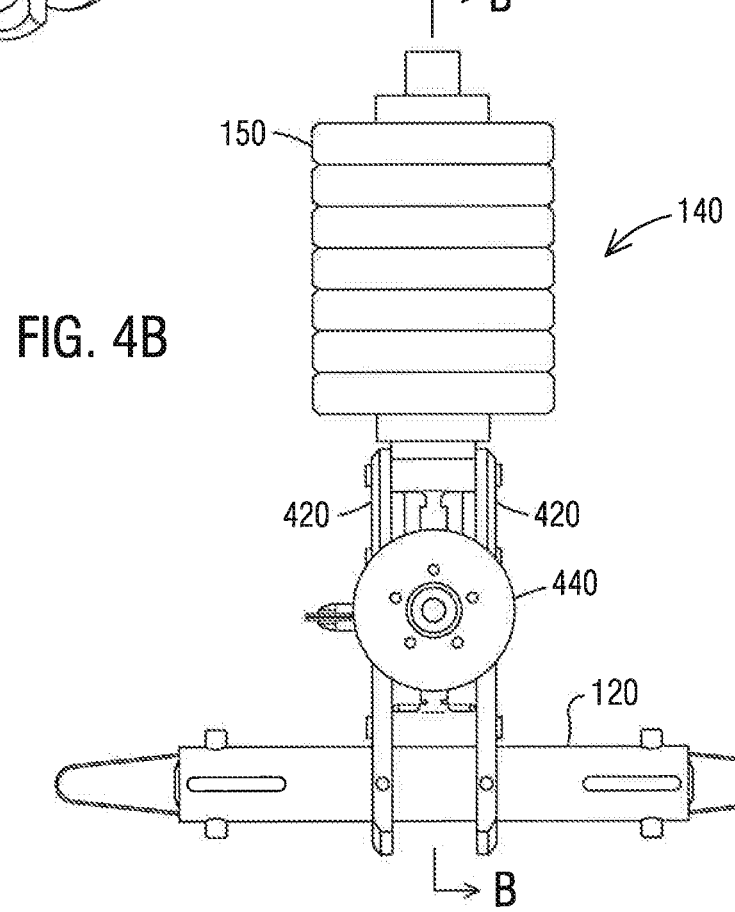
Figure 4C:
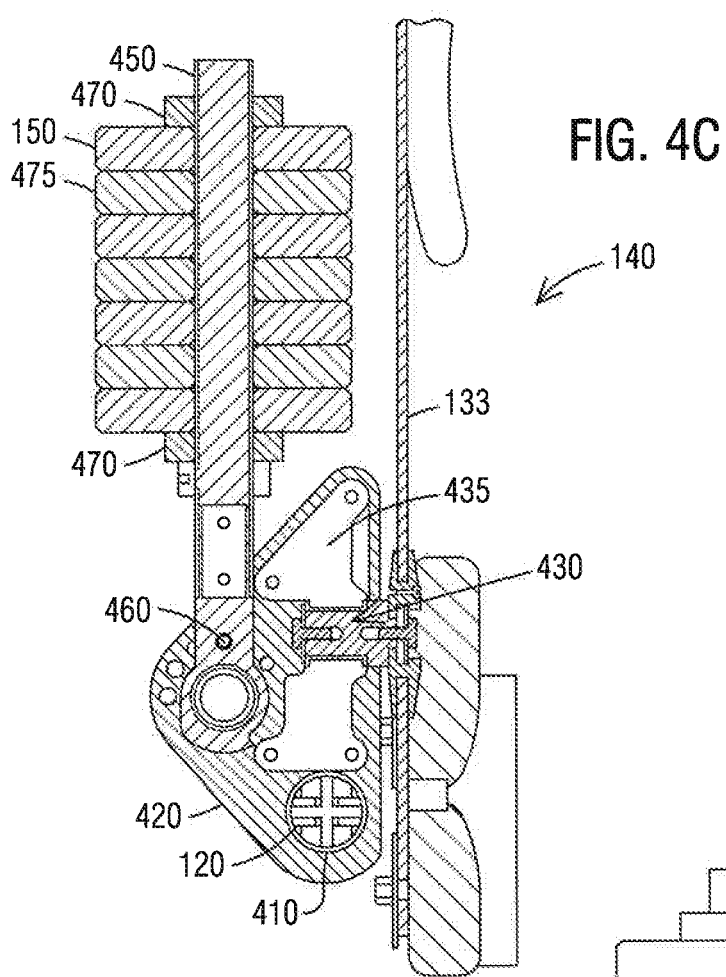

FIG. 4A illustrates a perspective view of the torso assembly 140 without the back support 133 attached. FIG. 4B illustrates a front view of the torso assembly 140 without the back support 133 attached. FIG. 4C illustrates a cross section view of along B-B of FIG. 4B, but with the back support 133 attached. The torso assembly may be attached to the hip arc 120. As illustrated, the hip arc 120 may extend through openings 410 in two brackets 420 of the torso assembly 140. A torso articulation connector 430 is provided, with a first end secured within a securing mechanism 435 within the torso assembly 140, located between the two brackets 420. A second end may provide for the connector 430 to be configured for connecting the torso assembly to the back support 133 of the harness 130. The connector 440 may be configured so that the second end of the articulation connector 430 extends through an opening in the back support 130. The second end of the articulation connector 430 may comprise a mechanism 440 configured to extend beyond the opening in the back support 130, on both sides of the back support so that the back support is placed, or sandwiched between the mechanism 440. The articulation connector 430 at the mechanism 440 may be configured to allow for torso articulation. More specifically, the back support 133 of the harness 130 may be configured to allow for rotation of the upper body of the user without movement of at least the first or second hip joint and the first or second tool interface. Thus, the user may rotate in a left to right direction whereas the torso assembly 140 remains stationary. As configured, the user is also able to move the user's upper body from side to side whereas placement of the counter weight component 150 or the hip arc 120 may not move simply because the user is moving the user's upper torso. Such movement contemplated may include, but is not limited to, reaching or extending an arm towards a side of the user or bending of a back of the user to either side. Though a particular mechanism 440 with a particular articulation connector 430 is disclosed for providing torso articulation, other techniques/approaches may be utilized to provide for torso articulation.

The counterweight component 150 may be provided to counteract a moment created by the arm 1200. The counterweight component 150 may comprise a boom 450 which may rotate upward and downward such as, but not limited to, angles ranging from 30, 60 or 90 degrees. A pin system 460 may be provided to adjust the boom 450 at a desired angle. Thus, the boom 450 may be adjustable to ensure the user's center of gravity remains over the user's feet. A release mechanism 470 may be provided at an end of the boom closest to the pin system 460 and/or at a distal end from the pin system 460 to secure weights 475 in place on the boom 450. In a non-limiting example, by having the release mechanism 470 before and after a stack of weights 475, when fewer than a number of weights are used that may cover the complete boom 450 are used, the release mechanisms 470 may be placed to define where on the boom 450 the weight 475 or weights 475 may be located. In another embodiment, a length of the boom 450 may be adjustable, such as, but not limited to, with a push-pin locking subsystem, where such a subsystem may comprise a plurality of opening on an outer surface and a detent or pin as part of an inner surface that slides or moves within the outer surface wherein the pin or detent is configured to extend into one of the plurality of openings when aligned with the opening.

In a hybrid exoskeleton system, or a powered exoskeleton system, a part of the system may be powered and a part of the exoskeleton system may be non-powered. In a non-limiting example, the boom component 450 may be powered. In this non-limiting configuration, the boom 20 may be moved in a plurality of directions about a central attachment point to the back support 133 by way of the user using a controller (not shown), that may be located on the hip arc 120 at a location easily reachable by one of the user's hands. A power supply (not shown) may also be a part of the torso assembly 140. Thus, the boom 150 may be angled off-axis of a vertical positioning of the boom 450 should the user need the weights 150 on the boom 450 displaced in a particular direction to compensate for location of the remote arm 1200. In another non-limiting embodiment, the same configuration and movement disclosed above of the boom 450 with respect to FIGS. 4A-4C may also utilize the boom 450 being powered so that angling of the boom is controlled by the controller.

FIGS. 5A-5F illustrates another counterbalance system of the exoskeleton system. As shown, a counterbalance arm 560 is provided. The counterbalance arm 560 is secured to the exoskeleton 100 by way of the tool connector 160. More specifically, the counterbalance arm 560 has a first end 565 and a second end 570. The first end 565 is secured to the tool connector 160. The second end 570 is moveable in an arcuate rotation from in front of the tool interface 160 or tool interface 710 (further initially illustrated in FIG. 8A) to behind the tool connector 160 or tool interface 710. More specifically, the counterbalance arm 560 is movable about its first end 565 to allow for placement of the counterbalance arm 560 at a desired location along the arcuate rotational path of the counterbalance arm 560 may be moved.

Figure 5A:
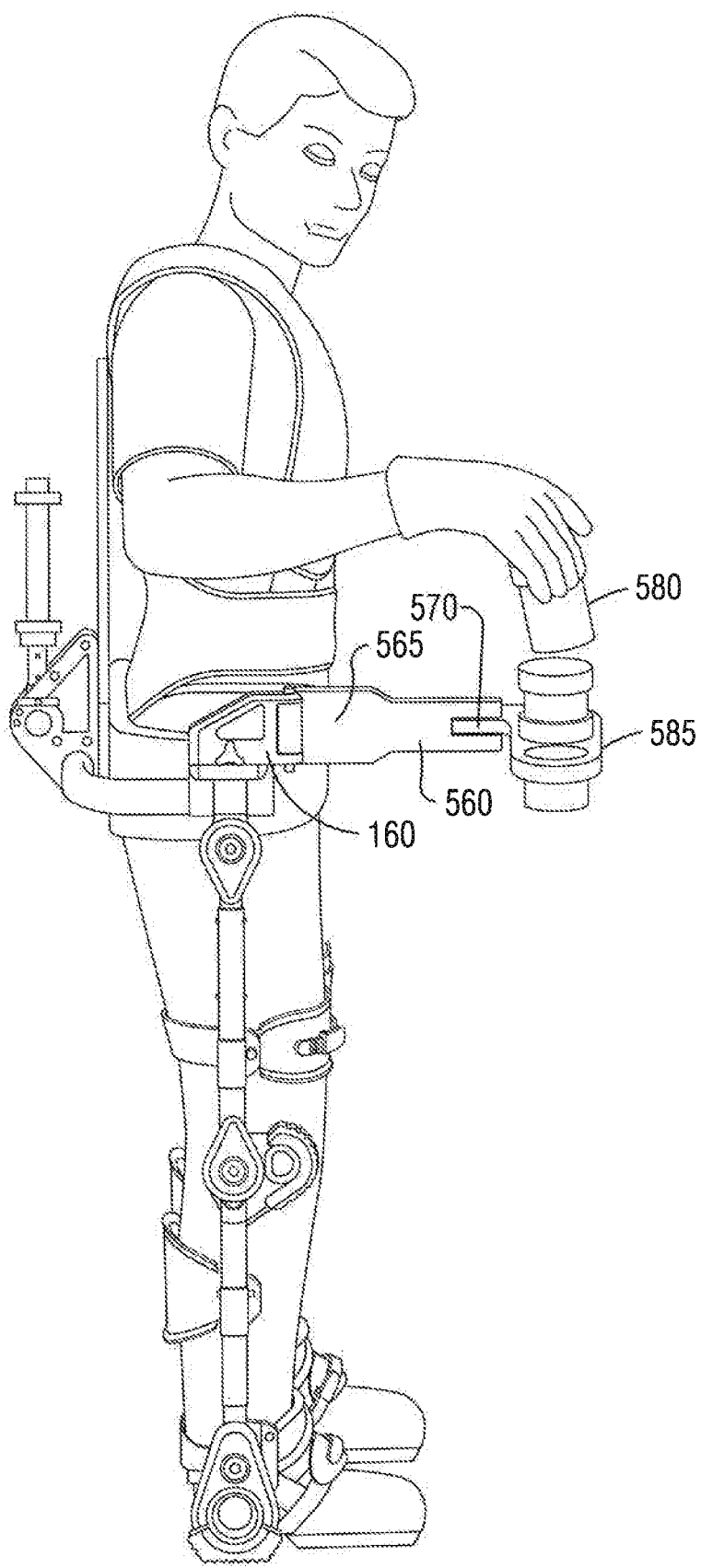
FIGS. 5A-5F show another counterbalance system of the exoskeleton system.
Figure 5B:
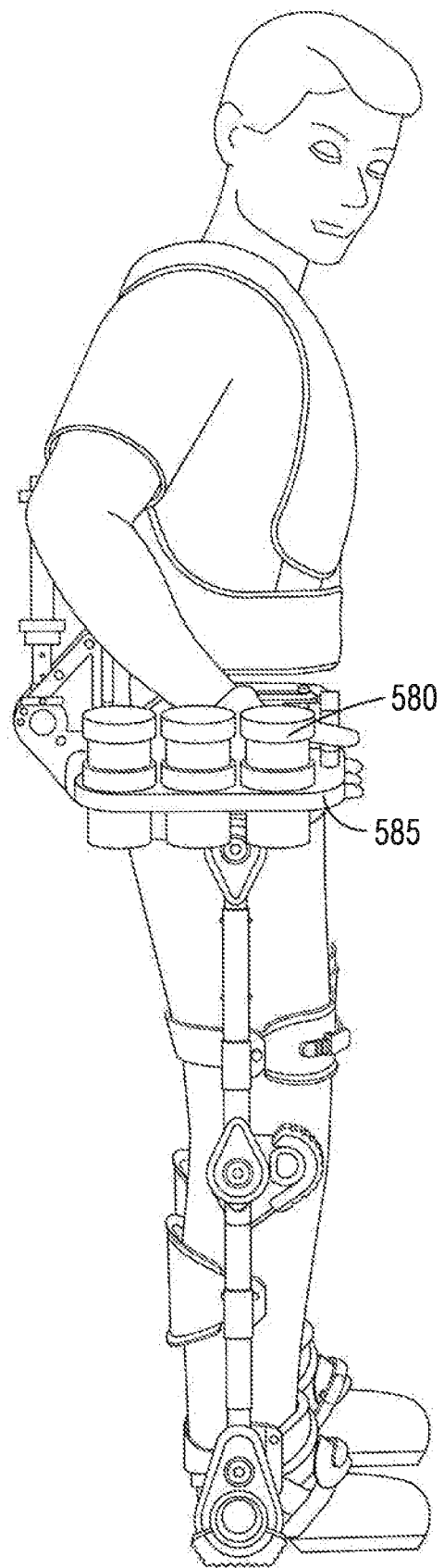
Figure 5C:
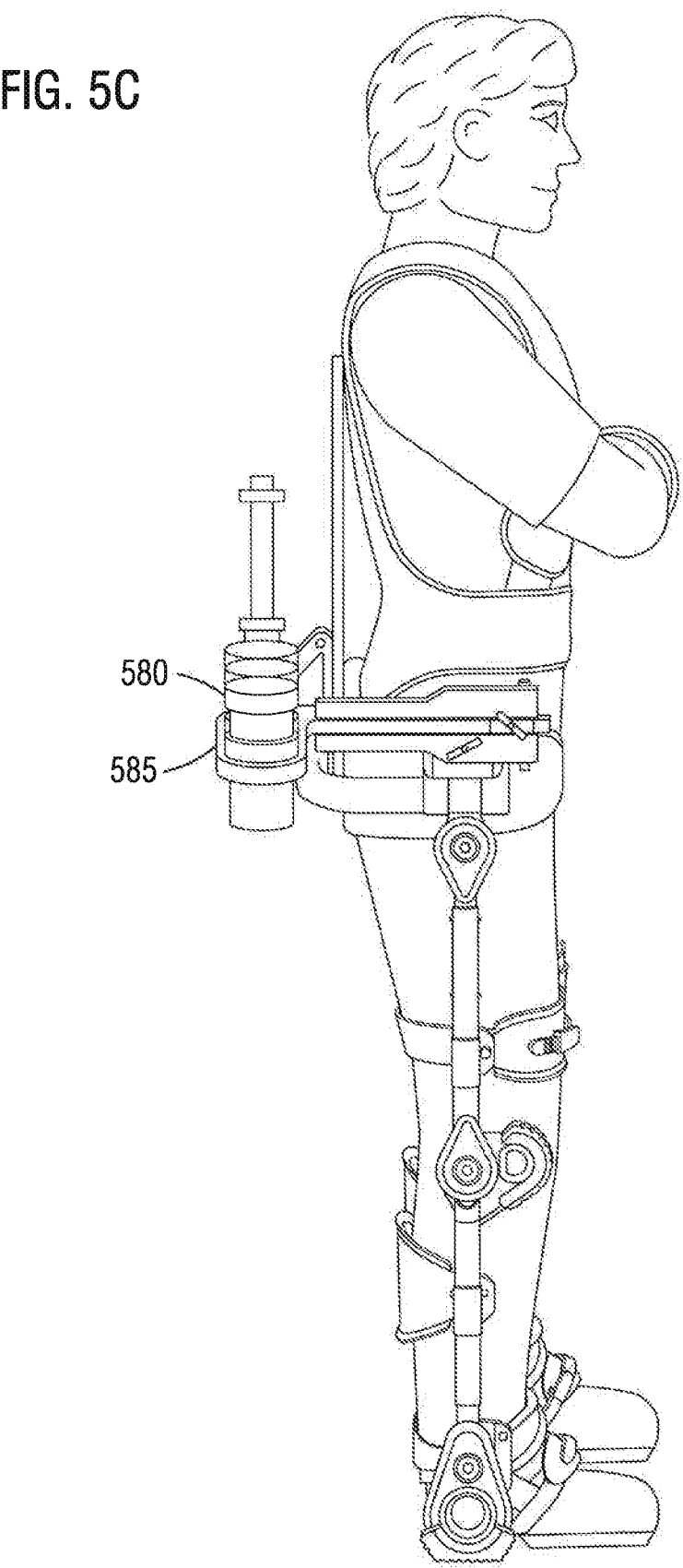
Figure 5D:
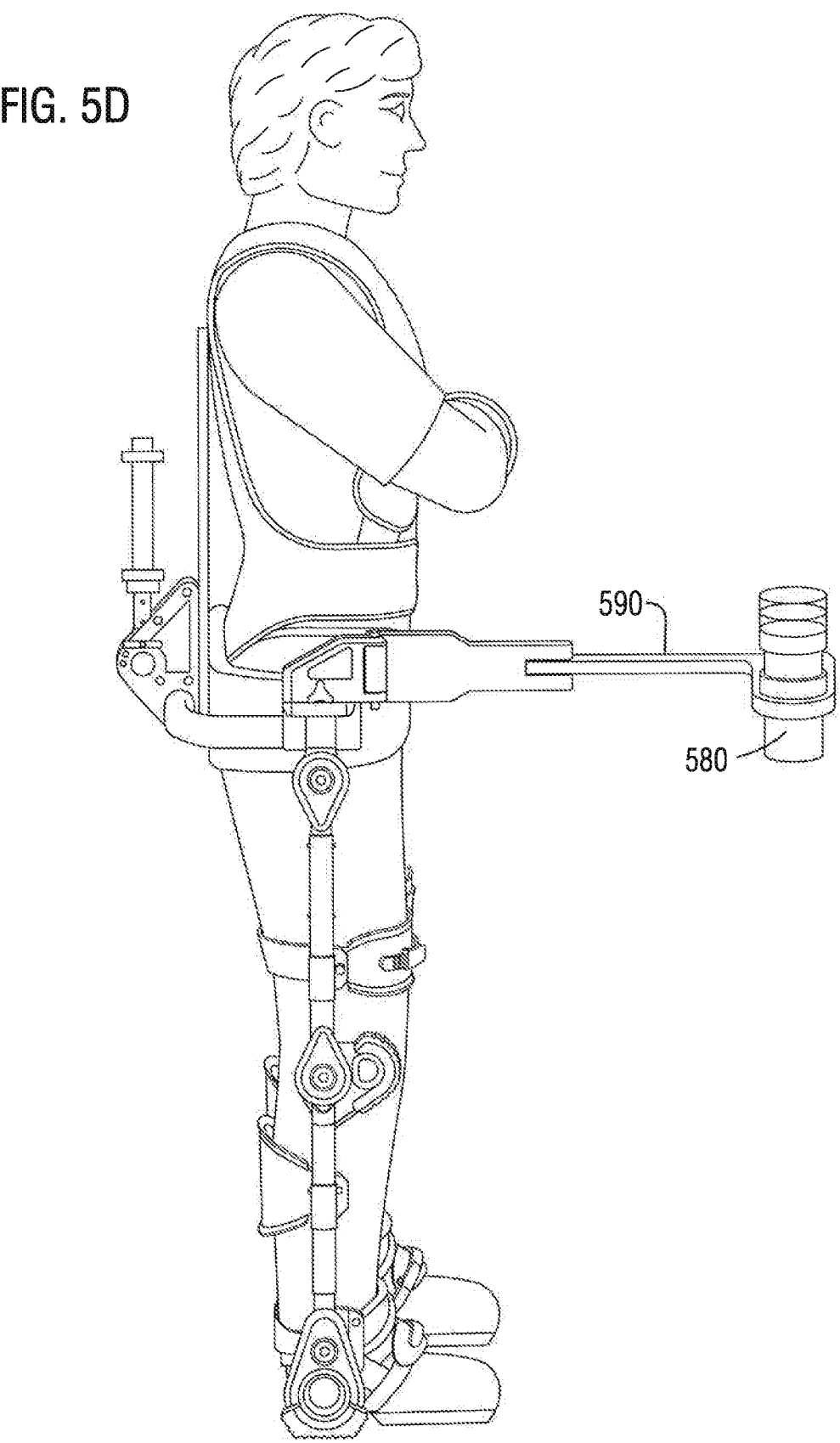
Figures 5E, 5F:
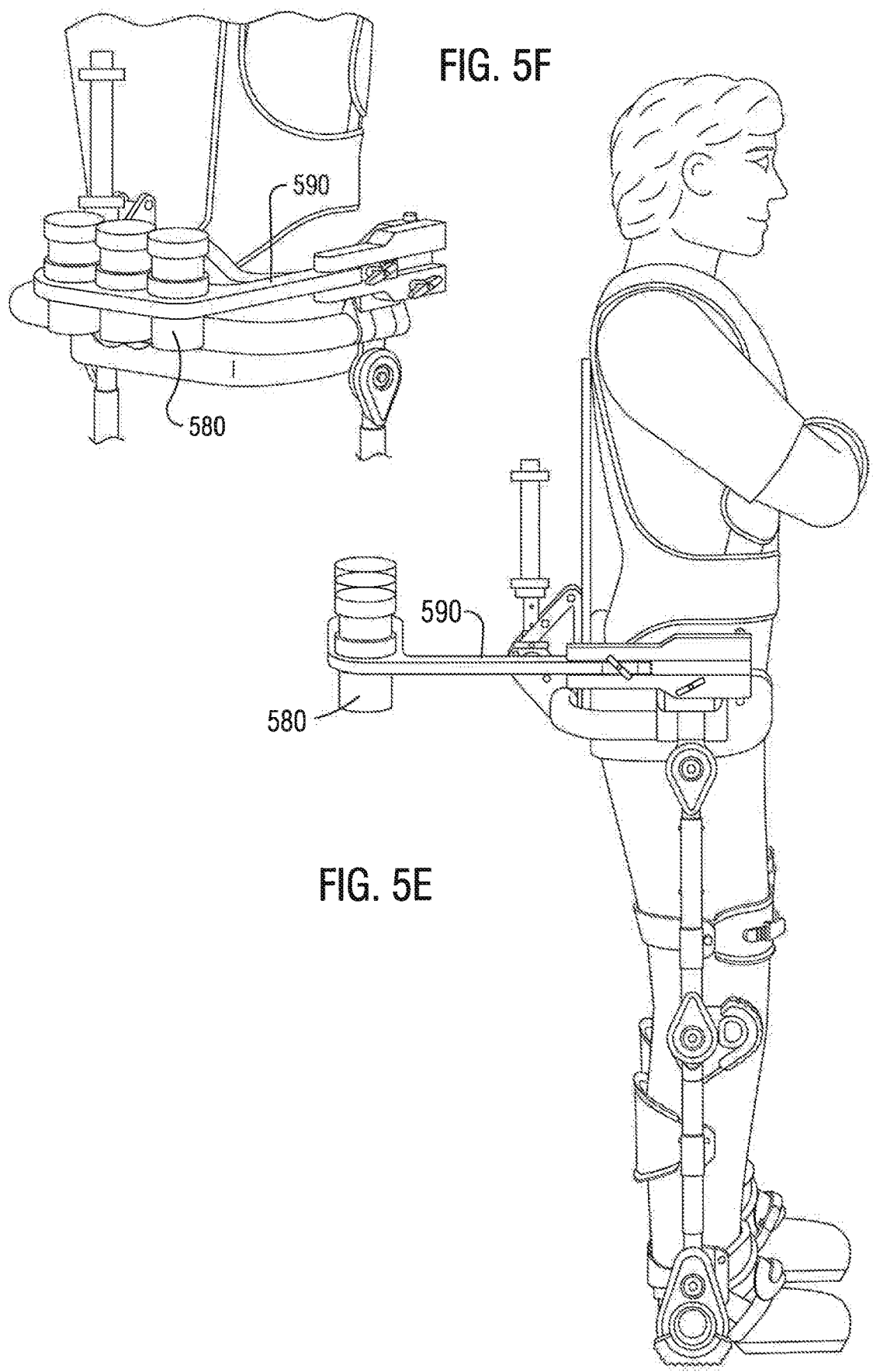

Placing the counterbalance arm 560 behind the tool connector 160 may provide for the counterbalance arm 560 positioning a counterbalance weight 580 added to the counterbalance arm 560 at a backside of the user, as shown in FIG. 5F. Depending on the weight of the counterbalance arm 560, a weight 580 may not be needed. To hold or secure the counterbalance weight 580 or weights as illustrated, the counterbalance arm 570 comprises a receiver 585 to which the weight 580 is attached or secured. The counterbalance arm 570 may also comprise an extension element 590 to adjust a distance of the counterbalance weight 580 or end of the counterbalance arm 570 from the user, as is shown in FIGS. 5D and 5E.

Figure 6A:
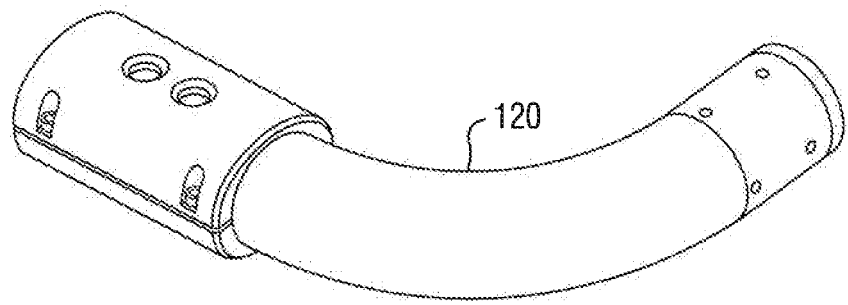
FIG. 6A-6C show views of a hip arc assembly.
Figure 6B:
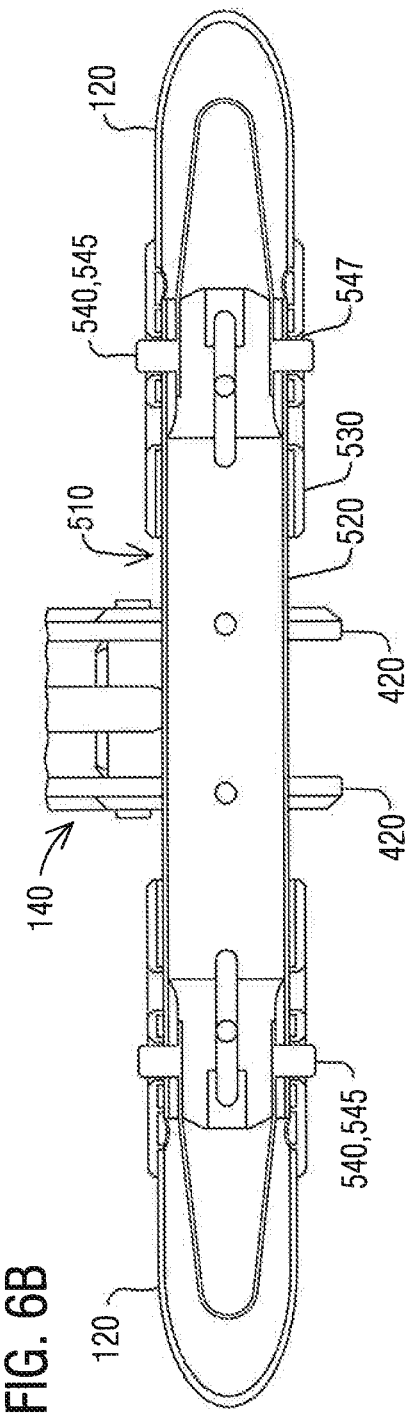

FIG. 6A illustrates a perspective view of a first end of the hip arc assembly. FIG. 6B illustrates a cross-section view of the hip arc in combination with it connecting to the torso assembly. As illustrated in FIG. 6A, the hip arc 120 curves so that an end of the hip arc 120 is located towards a front of the user and terminates at the hip arc 600. Since the hip arc 120 essentially extends, or wraps, around a backside of the user, to accommodate a plurality of differently sized users, the hip arc is adjustable. As illustrated further in FIG. 6B, a non-limiting example of how the hip arc 120 may be adjustable is with a telescoping tube interface assembly 510 where an inner tube 520 is connected to the torso assembly and an outer tube 530 is a part of the hip arc 120 that extends around the user's hip. A push-pin connection subsystem 540, where at least one pin 545 and at least one opening 547 are disclosed, may then be provided to adjust a width between each side of the hip arc 120 to fit a plurality of sized users. While adjustable, the moment arm in a sagittal plane at the hip remains the same even though the widths between each side of the hip arcs do change. This may even be true if the same width adjustment is not made with each hip arc 120.

Figure 4D:
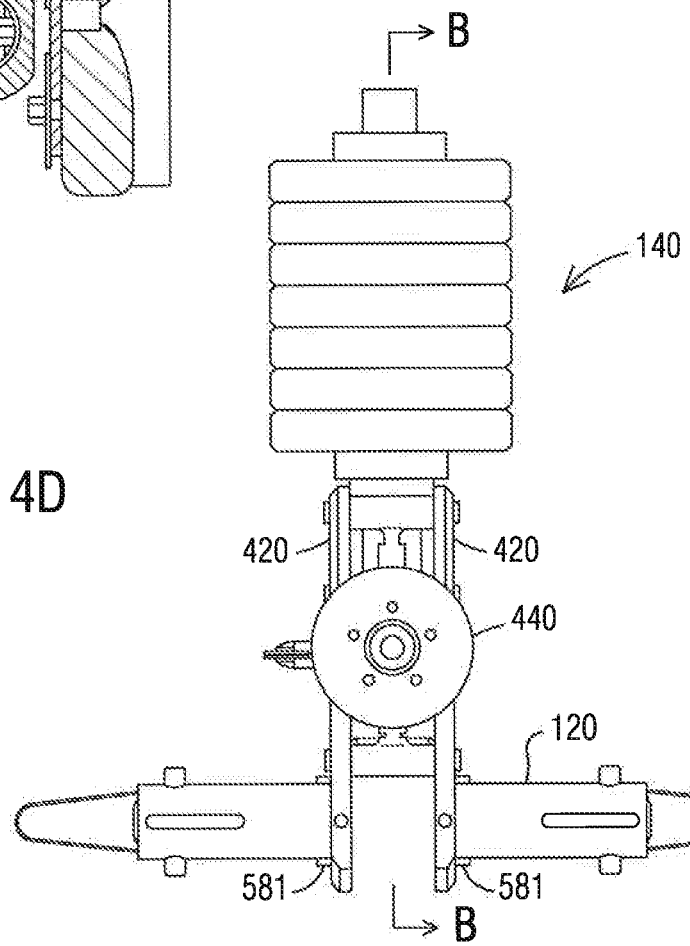
Figure 4E:
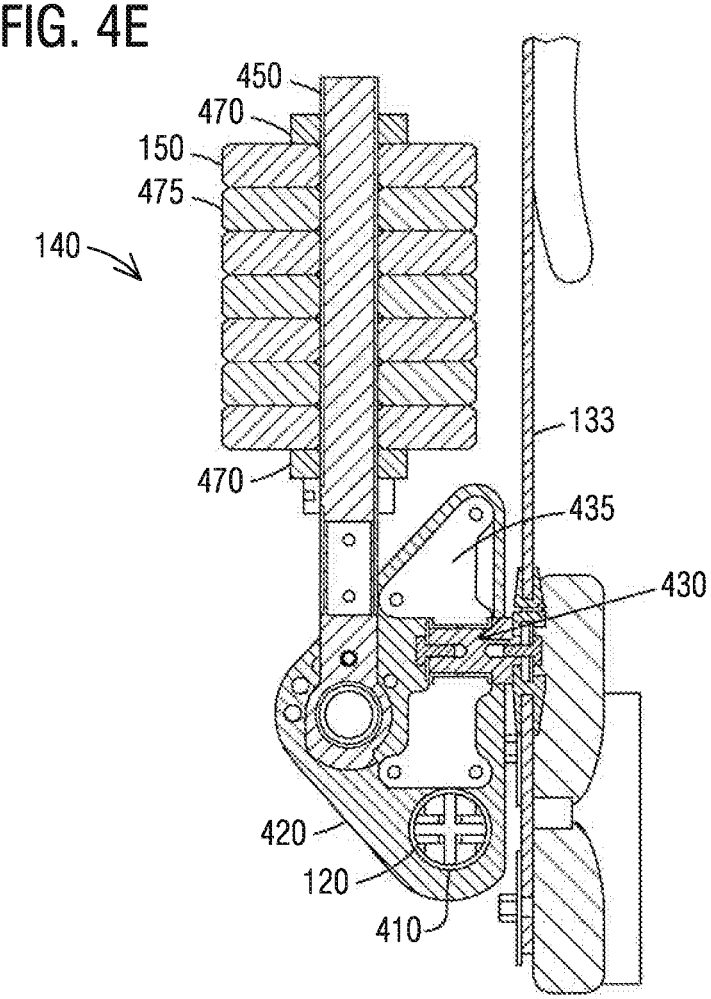
Figure 6C:
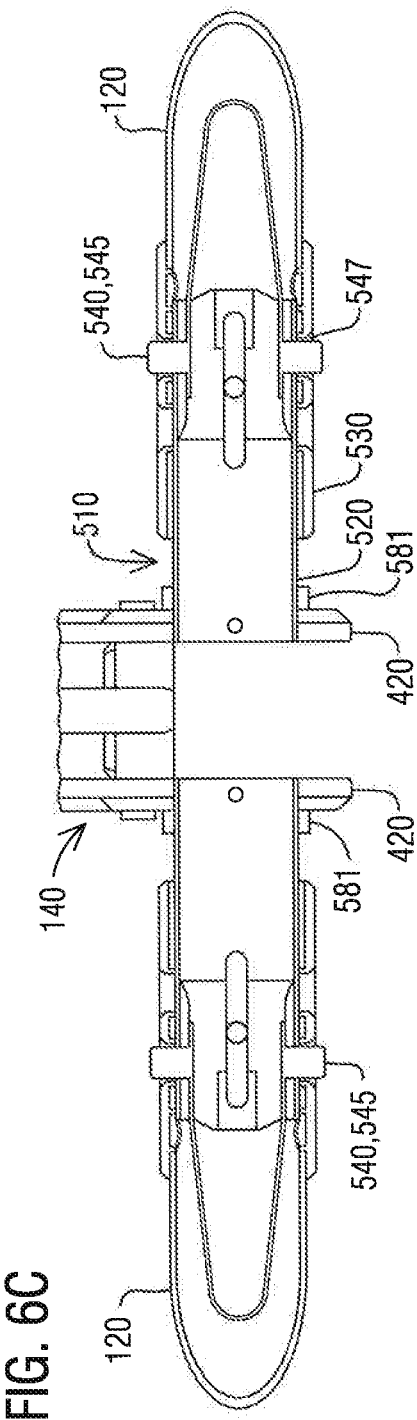

Another embodiment illustrating the hip arc attached to the torso assembly 140, or harness 130 is provided in FIGS. 4D, 4E, and 6C. As shown, each hip arc 120 may be separate and apart from the other hip arc 120. Respective connectors 581 are provided on the harness 130 or torso assembly 140 to which a respective hip arc 120 is attached. Each hip arc 120 may still comprise an adjusting element 540, 545 to provide for fitting each hip arc 120 around the user. By being separate and apart from each other, the load experienced by the tool 1200 may be primarily transferred to the hip joint 600 on the side of the user where the tool 1200 is connected while the load associated with the counterbalance arm 570, as illustrated in FIGS. 5A-5F, may be primarily transferred to the hip joint 600 on the other side of the user, where the counterbalance arm 570 is attached. As used herein the torso assembly 140 and harness 130 may be part of a same component used to attach the exoskeleton system 100 to an upper torso of the user. As such, these terms may be used interchangeably and the use of one over the other is not meant as a limitation.

Figure 7A:
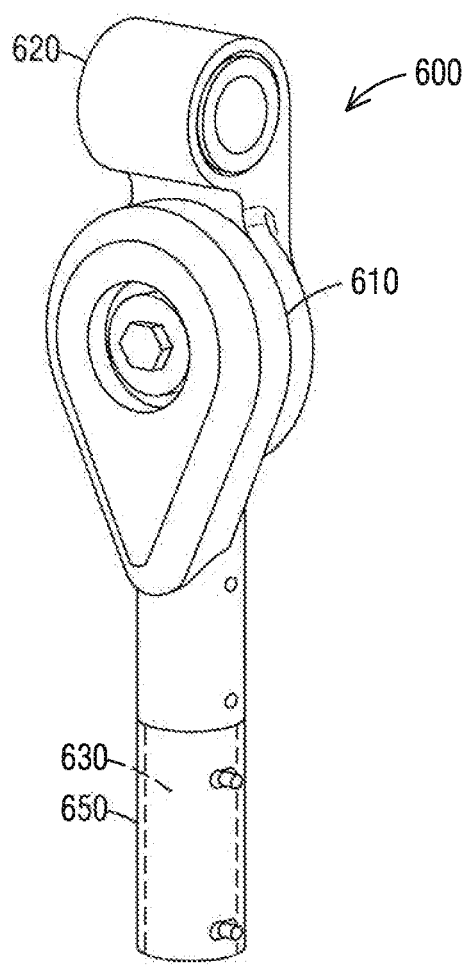
FIGS. 7A-7C show different perspective views of a hip joint.
Figure 7B:
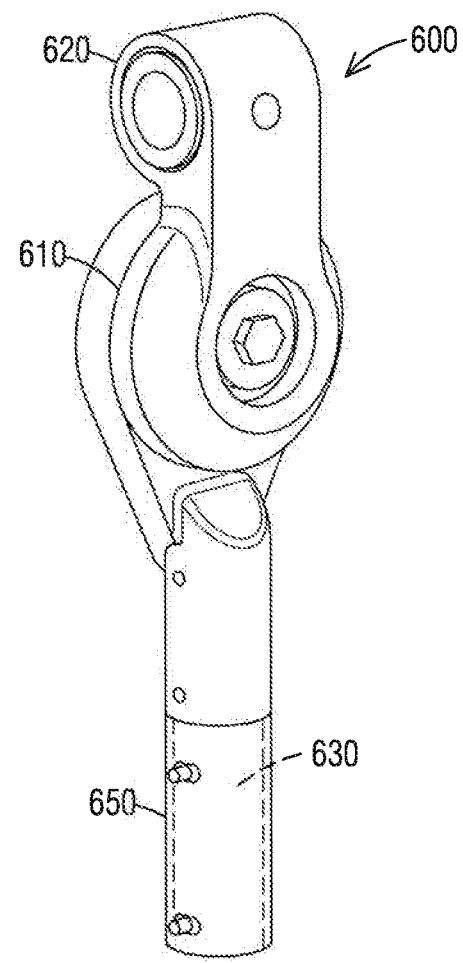
Figure 7C:
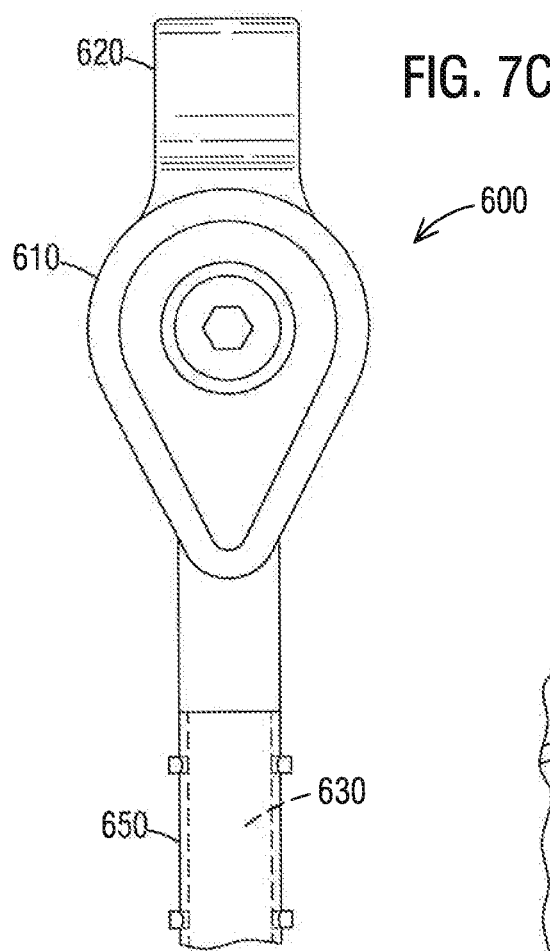

FIGS. 7A-7C illustrate perspective views of a hip joint. At the ends of the hip arc 120, a hip joint 600 is located. The hip joint 600 may comprise a first joint 610 that provides for forward and backward movement, in response to movement of the user's leg. Though a user is disclosed herein wherein the use of the term leg, foot, or shoe are used, the user may not necessarily be human and as such the term appendage may be used to generally describe what may be used within the exoskeleton system 100. The backward movement is limited to a range equivalent to how far back the user's leg may move backwards to reduce a possibility of the user hyperextending the leg. As a non-limiting example, a stopper, or tab 770 (illustrated in FIG. 8B), may be placed within the joint to limit its ability to extend too far backward. More specifically, a track 775 (illustrated in FIG. 7B) is provided with the tab 770 that prevents the joint from moving along the track beyond where the tab is located. The tab 770 and track 775 together may be considered an anatomically limiting device that controls backward movement of the hip joint to prevent hyperextending the leg of the user when within the system. The hip joint 30 may have a second joint 620, configured to attach to the hip arc 120, so that a user may extend the leg laterally outward or inward from a side of the user, or from left to right. How far laterally outward or inward may also be limited with a tab or stopper within the second joint 620, or an anatomically limiting device to control lateral movement of the hip joint beyond a lateral range of the user's hip or leg.

As illustrated in FIGS. 1-3, an adjustable femur component 650 of the exoskeleton system 100 extends from the hip joint 600, along a side of the leg or along the femur of the user, to a knee joint 700 which is adjacent to a knee of the user. The hip joint 600 is further configured to provide for the hip joint 600 to rotate azimuthally about a third joint 630 with respect to femur component 650. As disclosed above with respect to the first joint 610 and the second joint 620, and as further illustrated in FIG. 8B, the third joint 630 may have a tab 777 or stopper and track 779, collectively an anatomically limiting device to prevent the third joint 630 from azimuthally rotating beyond a range of the leg, or appendage, of the user when within the system 100.

Figure 8A:
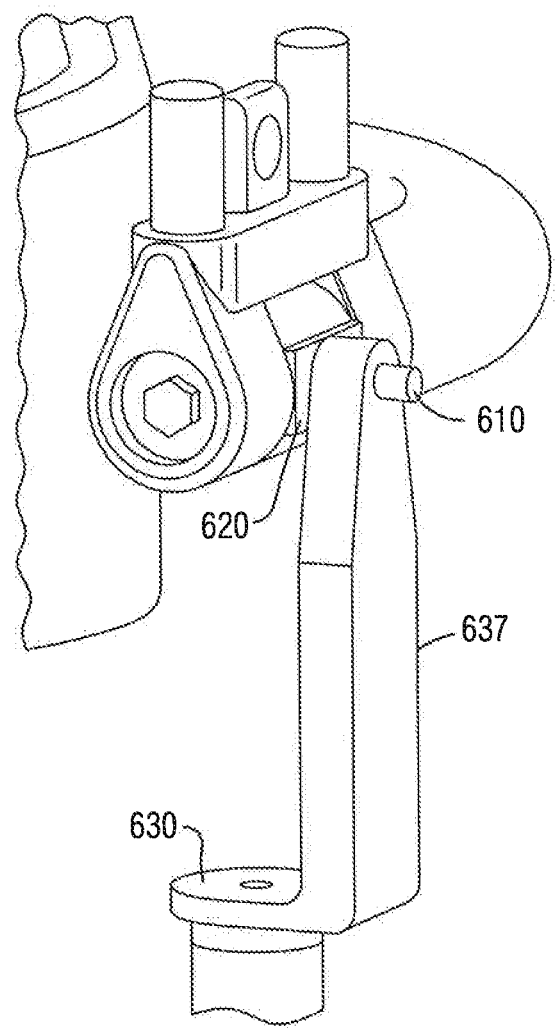
FIGS. 8A-8B show different embodiments of an orthogonal hip joint.
Figure 8B:
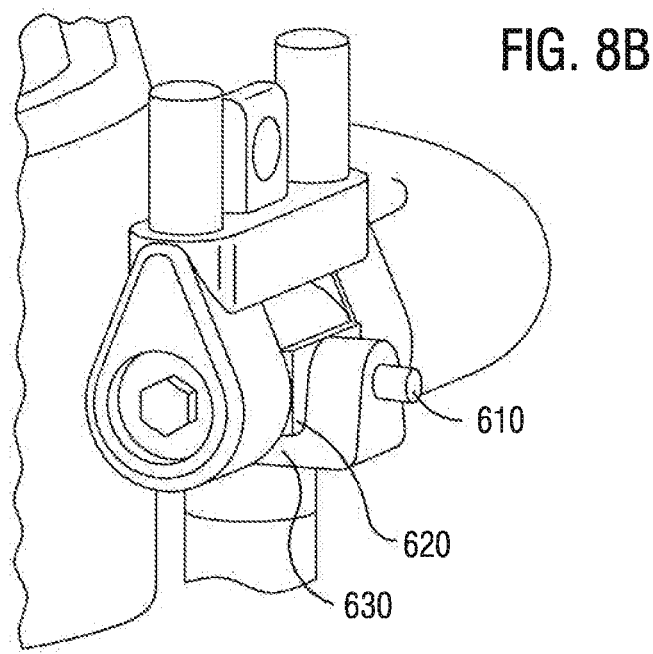

A configuration of the first joint 610 being located between the second joint 620 and the third joint 630, with the third joint 630 being below the first 610 provides the hip joint 600 with a configuration that most accurately emulates the anatomic characteristics of the hip and/or leg of the user, when within the system. Other configurations are also possible, including the first joint 610 between located between the second joint 620 and the third joint 630 with the second joint being below the first joint 610; the second joint 620 between the first joint 610 and the third joint 630 with either the first joint 610 or the third joint 630 being below the second joint; the third joint 630 between the first joint 610 and the second joint 620 with either the first joint 610 or the second joint 620 being beneath the third joint; or an orthogonal hip joint. As illustrated in FIGS. 8A and 8B, the orthogonal hip joint provides for the first joint 610, second joint 620, and third joint 630 to part of a single joint. As illustrated in FIG. 8A an extension 637 may be provided between the first joint 610 and the third joint 630. As illustrated in FIG. 8B no or a minimized extension may be included.

The femur component may be considered an upper leg section or component. Thus, as the user rotates the user's hips such as, but not limited to, with the user's feet remaining stationary, the hip joint 600 may rotate azimuthally about the femur component 650. A range of rotation may be limited. Thus, the hip joint 600 may be configured to move in any direction the user's hip joint may move. As such, the hip joint 600 may be viewed as having three degrees of freedom since it may move forward/backward (abduction and adduction around the sagittal axis), left/right (flexion and extension around a transverse axis), lateral rotation and medial rotation around a longitudinal axis (along the thigh), and a combination of these movements where the degrees of freedom and actual movement are provided to replicate a respective degree of freedom, or movement, of the hip of the user.

Figure 9A:
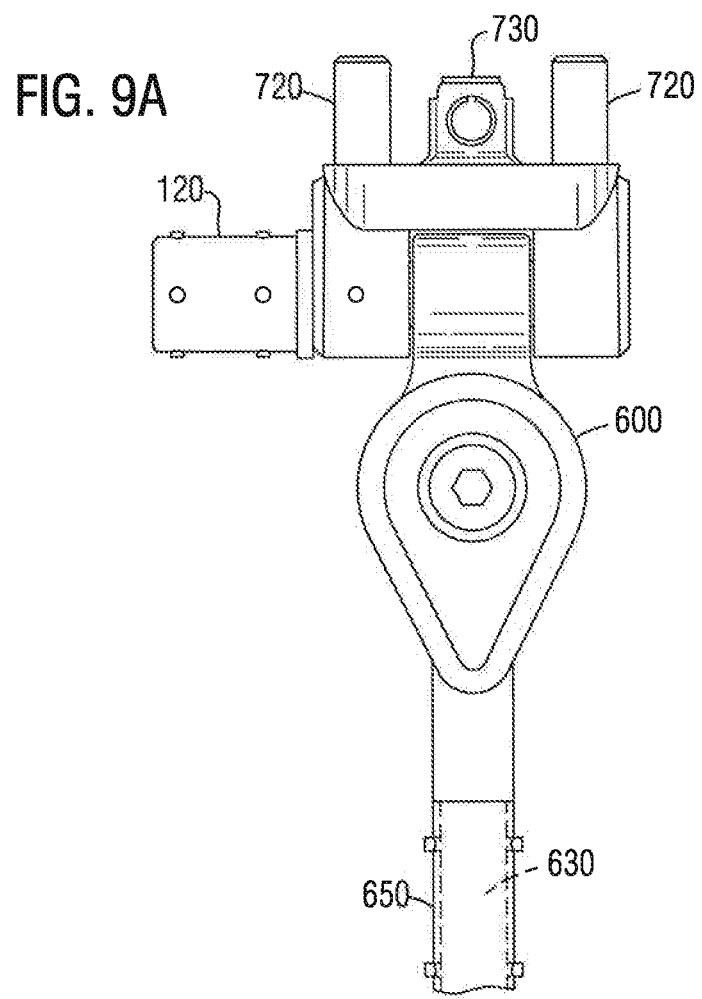
FIGS. 9A-9C show different views of a tool holder.
Figure 9B:
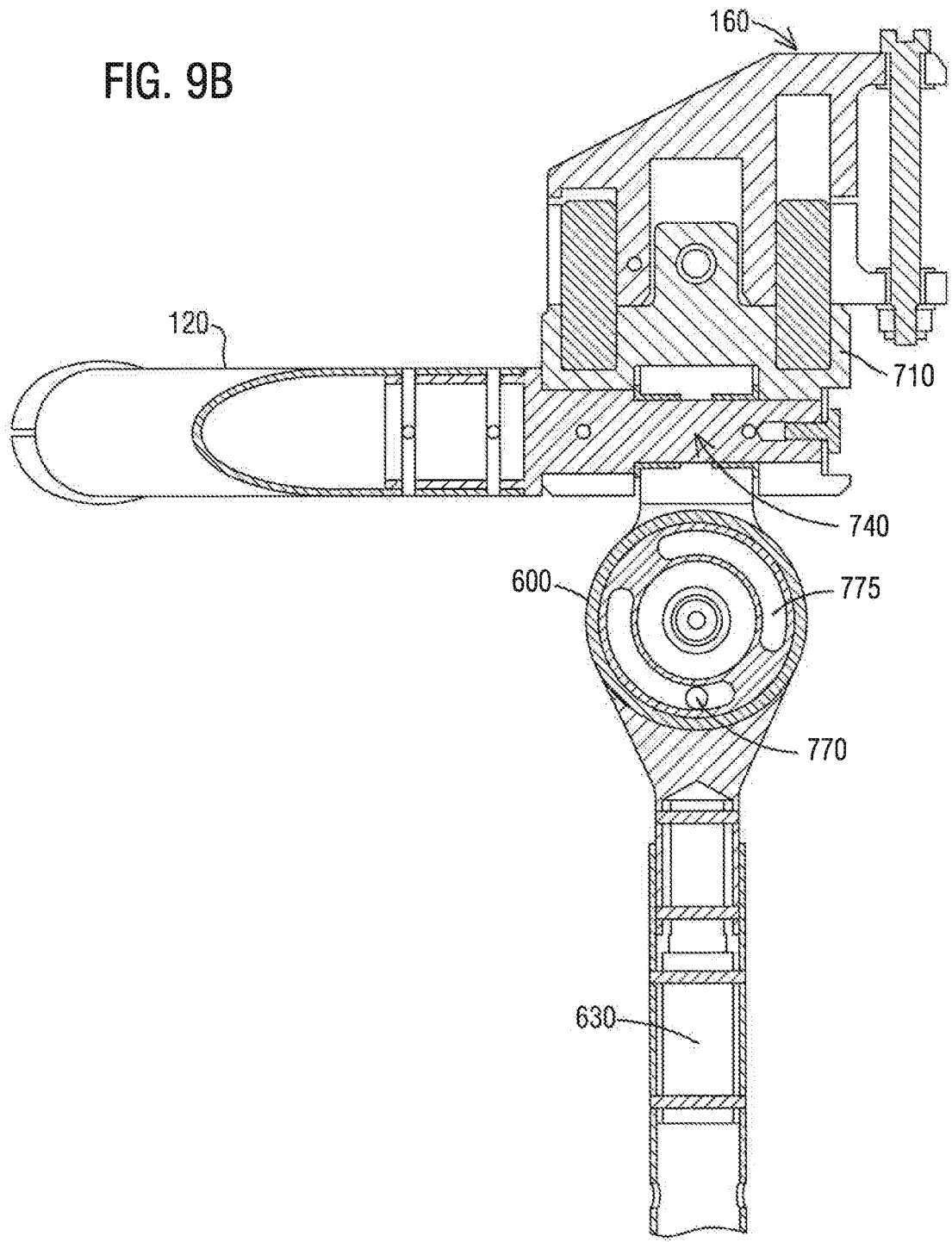
Figure 9C:
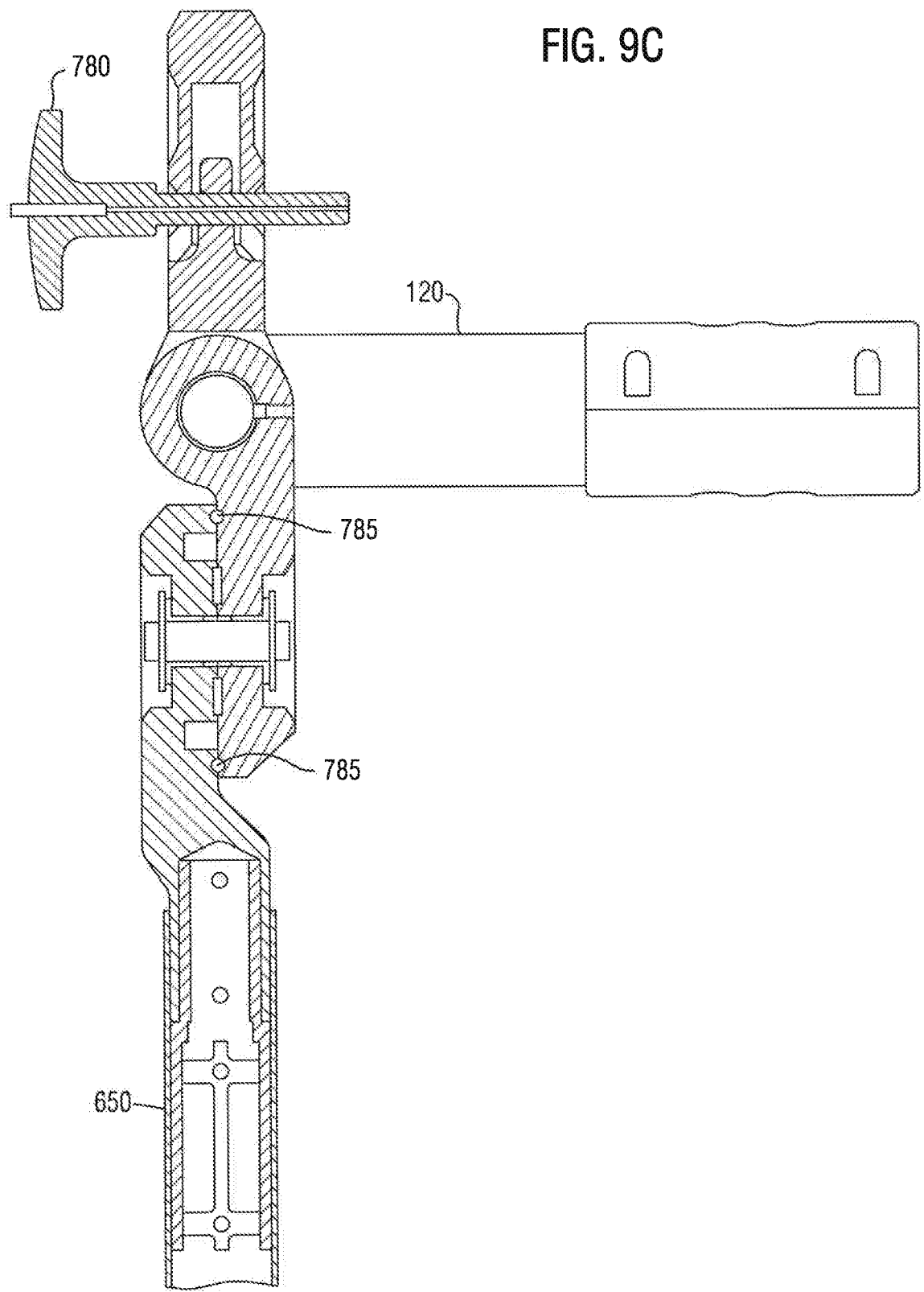

FIGS. 9A-9C illustrate views of the hip joint in combination with the tool interface. As illustrated in FIG. 9A, the hip arc has a tool interface 710 for the removable tool connector 160. The removable tool interface 710 may be configured as a quick connect/disconnect or release interface to facilitate the rapid attachment and removal of the interface 710 to the hip arc 120 or hip joint 600. The tool connector 610 attaches to the tool interface 710. The removable tool connector 160 allows various utility tools to be attached thereto. Then, the connector 160 may be subsequently attached to the interface 710. The tool interface 710 may be located above the hip joint 600. As a non-limiting example of the tool interface 710, this interface 710 may comprise at least one guide 720 upon which the tool connector 160 connect to so that the tool connector 160 is always connected to the tool interface 710 in a same manner each time. A locking mechanism 730 may also be provided. In a non-limiting example, the locking mechanism 730 may be configured to receive a pin 780 through the locking mechanism 730 and the tool interface 160 when the tool connector 160 is attached to the interface 710, as further illustrated in FIG. 8B, thus providing for a quick release mechanism.

FIG. 9B illustrates a cross section, taken from a side view similar to FIG. 2, of the hip joint in combination with the hip arc and tool interface. As further shown, the third joint 630 of the hip joint 600 may provide for an internal shaft that provides for rotation of the femur component 650 as disclosed above. To allow for fuller movement of the tool 1200, attached to the tool connector 160 is the interface 710 which may be configured to allow for rotation of the tool interface 710, and hence the tool connector 160. A spindle 740 may be provided. In one non-limiting example, the spindle 740 and interface 710 may be built into the hip joint 600. In another non-limiting example, the interface 710 is a separate component which may be attached to an end of the hip arc 120 or atop the hip joint 600. When a separable component, the spindle 740 may be a part of the interface 710.

FIG. 9C illustrates a cross section, taken from a front view of the exoskeleton 100, of the components illustrated in FIG. 7B. The first joint 610 of the hip joint 600 may provide for a seal 785, making the joint a seal joint. The pin 780 is disclosed to secure the tool connector 160 to the interface 710. The tool connector 160 may be removed from the interface 710 as needed.

FIGS. 10A-10D illustrate perspective views of a thigh support. The thigh support 800 may have a thigh strap 810 attached to it, as further illustrated in FIGS. 1-3. Though illustrated, the thigh support 800 may not be needed. A possible determination on whether to use the thigh support is an anticipated load to handle with the exoskeleton 100. The combination of the thigh support 800 with the thigh strap 810 may also be provided to keep the upper part of the system 100 aligned with the user's legs. A quick release mechanism 820 is provided on each thigh strap 810 thigh support 800 combination. Since users have different sized thighs, a ratchet-based securing subsystem 820, or mechanism, may be provided as the quick release mechanism to secure the thigh strap 810 to the thigh of the user. When initially putting the system 100 on, the user may be in a sitting position while placing the thigh strap 810 around the thigh and connecting to the thigh support 800. Upon standing up, the user may have to further adjust the thigh strap 810, usually by removing any additional slack between the thigh strap 810 and the thigh support 800. By using the ratchet-based securing subsystem 820, the user may simply further remove any slack as opposed to having to completely readjust the thigh strap all over again. The ratchet-based securing subsystem 820 may further comprise a quick release device, that when activated, completely frees the strap 810 from the thigh support 800.

Figure 10A:
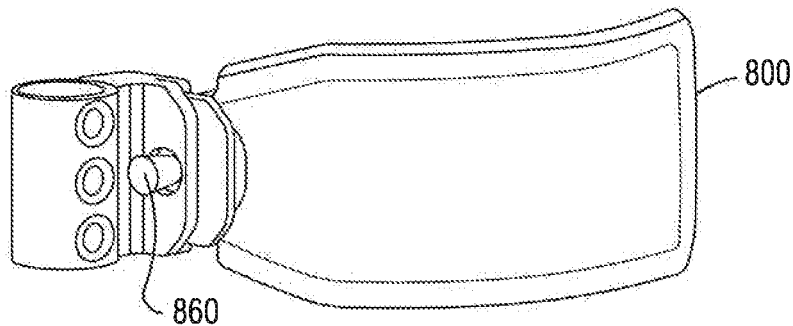
FIGS. 10A-10D show different perspective views of a thigh support.
Figure 10B:
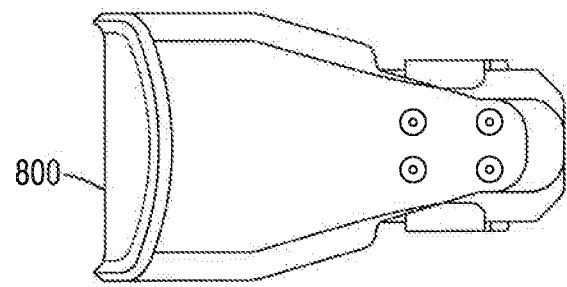
Figure 10C:
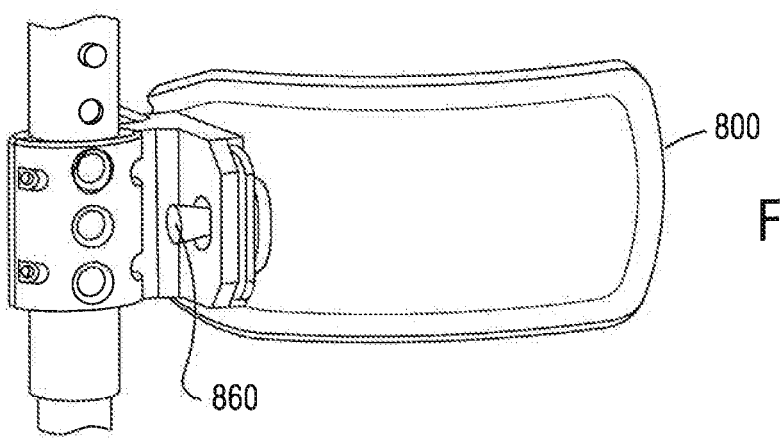
Figure 10D:
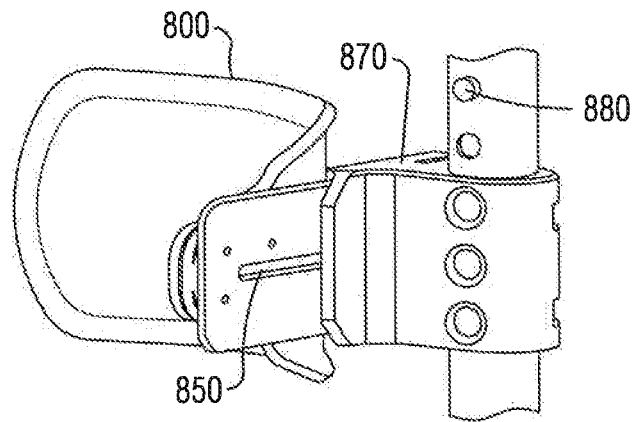

As further illustrated, a forward or backward (longitudinal) positioning of the thigh support 800 may be possible. As illustrated in FIGS. 10C and 10D a longitudinal adjustment track 850 is provided on a part of the thigh support 800 which engages a connector 870 on the femur component 650. Once located a desired longitudinal position is selected, a locking pin 860 may be used to hold the thigh support 800 in place. Lateral placement of the thigh support 800 may also be provided where a push-pin connection subsystem 880 may be used.

Figure 11A:
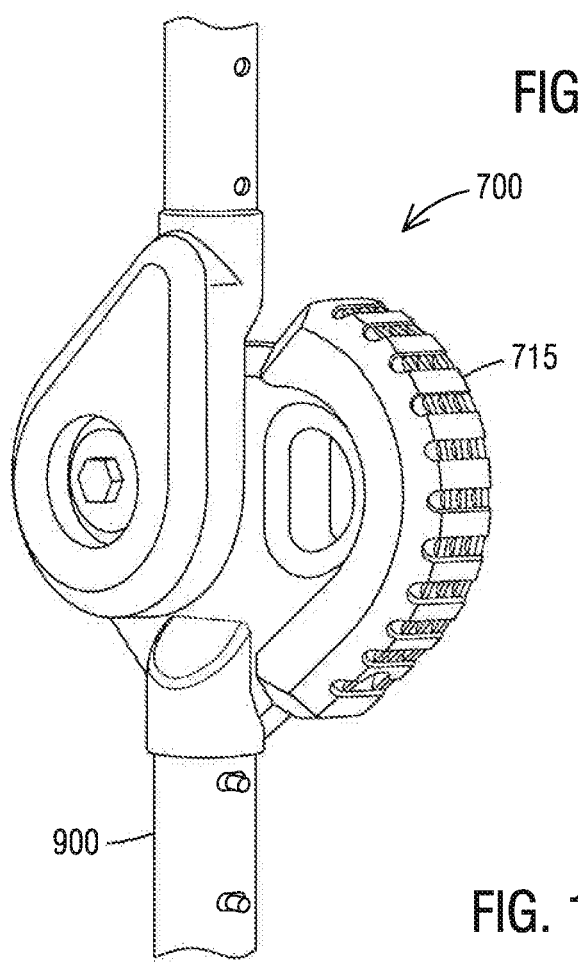
FIGS. 11A-11C show different views of a knee joint.
Figure 11B:
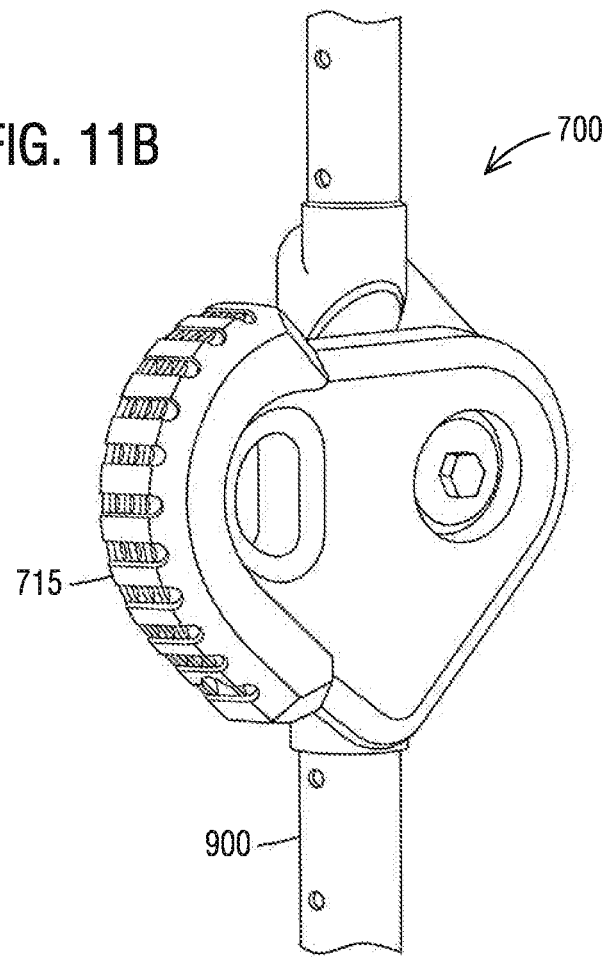
Figure 11C:
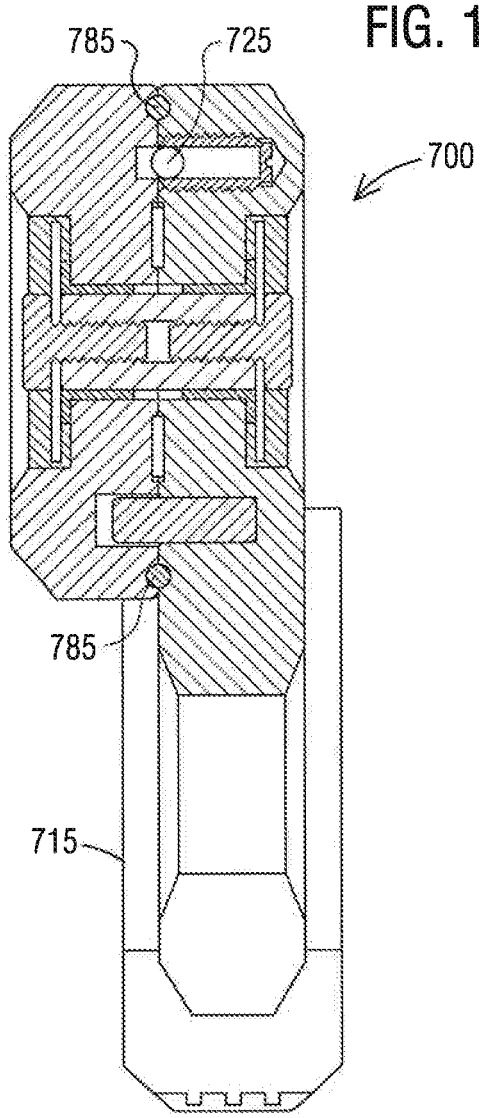
Figure 12A:
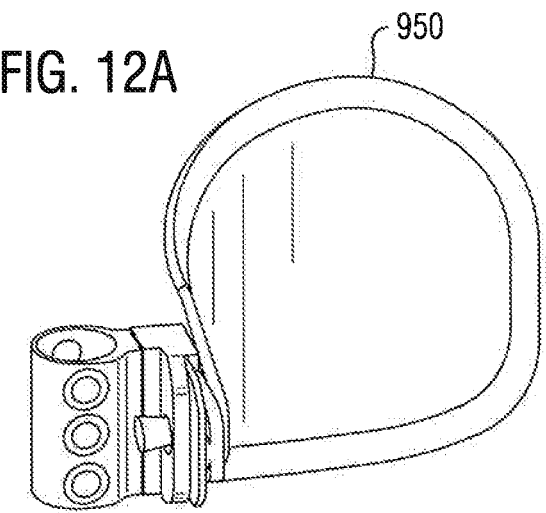
FIGS. 12A-12D show different perspective views of a calf support.
Figure 12B:
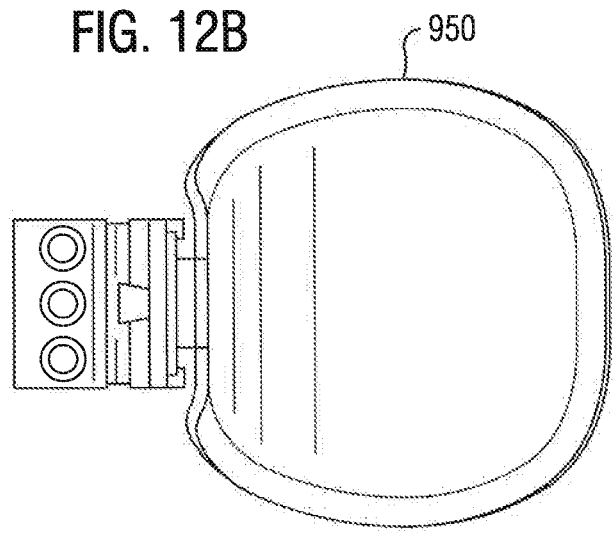
Figure 12C:
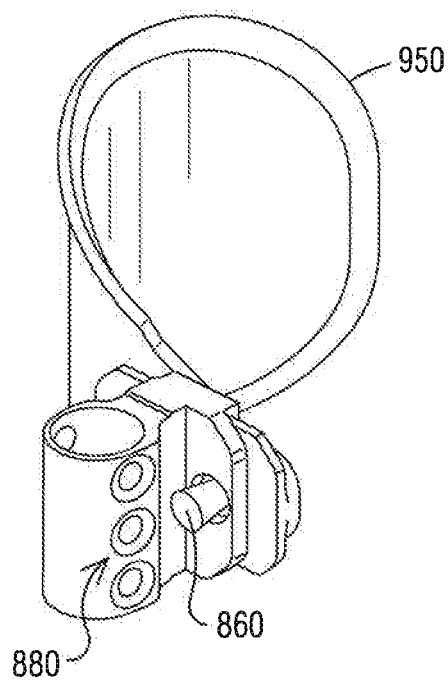
Figure 12D:
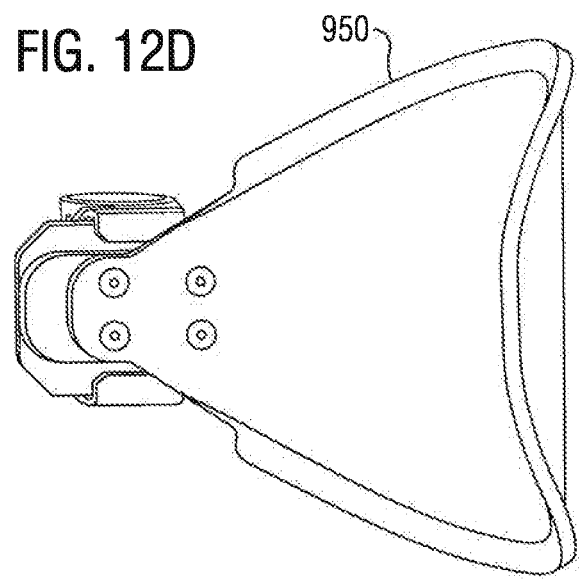

FIGS. 11A-11C illustrate views of a knee joint. As illustrated in FIGS. 1-3, the femur component 650 connects with the knee joint 700. Similar to the hip joint 600, the knee joint 700 may have a track 183 with a tab 185, or stopper, to prohibit the knee joint from moving in a forward direction location which may result in hyperextending the knee. The track 183 and tab 185 may be considered an anatomically limiting device. Though each anatomically limiting device is disclosed herein as having a track with a tab or stopper, other configurations may be used. Thus the term "anatomically limiting device" includes any configuration that limits one of the above mentioned joints to function or anatomically emulate a joint of appendage of the user when within the system.

Moving backward, the knee joint 700 may move beyond ninety degrees since the user's knee may bend the lower leg greater than ninety degrees. The knee joint 700 may also be configured to accept the load so that the load is not felt by on the knee of the user. The knee joint 700 may be configured to be approximately fifteen degrees, plus or minus five degrees, forward of the user's knee to further ensure that the load is not felt by the user's knee. The knee joint 700 may further be configured to extend forward with a rocker arm 715. When kneeling, the knee rocker arm 715 is configured to contact a ground surface first and maintain the load transfer through the knee rocker arm 715. Therefore, when the user's knee makes contact to the ground, the user's knee does not experience the weight of the load or the weight of the exoskeleton system 100 upon the user's knee. The knee rocker arm 715 may be configured with a curved configuration so that the user may rotatably displace the arm 715, or move along the curved configuration of the knee rocker arm 715 in a forward and backward position, such as to rock back and forth, whereas the load carried is not felt by the user upon the knee when manually positioned by the user when in contact with the ground. In other words, the arm 715 may be rotated and translated in a forward or backward position manually by the user.

Furthermore, due to the knee rocker arm 715 extending forward of the user's knee, the knee rocker arm 715 may provide additional protection to the user's knee, such as when walking around in areas where the user's knee may ordinarily come into contact with objects in a work area. With this configuration, should a user desire to wear a knee pad while wearing the system 100, the user may still do so without the system 100 or knee pad interfering with each other. Furthermore, with the curved shape of the knee rocker arm 715, the user is able to move a plurality of directions upon the user's knees where the system 100 is not prohibitive of such movements. An adjustable fibula component 900 extends from a bottom part of the knee joint 700 down to a foot assembly 1000. The adjustable fibula component 900 may also be considered a lower leg section or component.

FIG. 11C is a cross section of the knee joint taken from a front view of the exoskeleton system. As illustrated the knee joint may have a seal 785 providing for a sealed joint. Also illustrated is a positive locking indication component 725.

As further illustrated in FIGS. 1-3, the fibula component 900 may extend from the knee joint 700 to a ground rocker arm 1110 that may make contact with the ground when the user is in a standing position. The fibular component 70 transfers the load to the ground.

FIGS. 12A-12D show perspective views of a calf support. The calf support 950 may be provided on the fibula component 900. As disclosed above with respect to the thigh support 800, the calf support 950 may be similarly constructed. As non-limiting examples, the calf support 950 may have a calf strap attached to it. The combination of the thigh support 950 with the thigh strap may also be provided to keep the system 100 aligned with the user's legs. A quick release mechanism 820 may be provided on each calf strap and calf support 950 combination. Since users have different sized calves, a ratchet-based securing subsystem, or mechanism, may be provided as the quick release mechanism to secure the calf strap around the calf of the user.

A forward or backward (longitudinal) positioning of the calf support 950 may be possible. A longitudinal adjustment track may be provided on a part of the calf support 950 which engages a connector on the fibula component 900. Once located a desired longitudinal position is selected, a locking pin 860 may be used to hold or secure the calf support 950 in place. Lateral placement of the calf support 950 may also be provided where a push-pin connection subsystem 880 may be used.

FIGS. 13A-13D illustrate views of a foot assembly. The foot assembly 1000 may be connected to the fibula component 900 to secure the system 100 to the foot and ankle of the user. The foot assembly 1000 may have a back stirrup component 1120 to hold the user's foot in place. As further illustrated in FIGS. 1-3, a strap 1130 is configured to fit around the user's shoe where a sole of the shoe still makes contact with a ground surface or ground. Thus, user's foot is separate and apart from the foot assembly with respect to making contact with the ground. In this configuration, the user's natural gape and angle at which the user's foot naturally contacts the ground while walking is maintained. The strap 1130 may have the ratchet subsystem, as disclosed above with respect to the thigh support, to secure the foot to the foot assembly 1000. An ankle joint 1150 may be provided. The ankle joint 88 may be configured to allow the user to walk with the user's natural gape with the ground rocker arm 1110 remaining in a stationary position next to the foot.

When no load is present, the ground rocker arm 1110 generally does not make contact with the ground. Instead, when the user's foot, secured inside the stirrup component 1120, makes contact with the ground, the ground rocker arm 1110 also contacts the ground in unison with the user's foot. The ground rocker arm 1100 may ride slightly above the ground and move in unison with the user's foot. However, in some situations, depending on the user's stride, gape, or shoe, the ground rocker arm 1100 may inadvertently contact the ground when a load is not present. Once a load is present, the weight may cause the ground rocker arm 1100 to make contact with the ground. Thus, when the user's heel hits the ground, the back of the ground rocker arm 1100 may strike the ground in unison with the foot. In this situation, the weight of the load and the weight of the system 100 is directed to the ground and may not be felt by the user. The ground rocker arm 1100 may have a curved configuration, at an end that contacts the ground, to allow the user to rock back and forth, or to provide for rotatable displacement, in a forward or backward manner, in the system 100 as manually powered by the user.

Figure 13A:
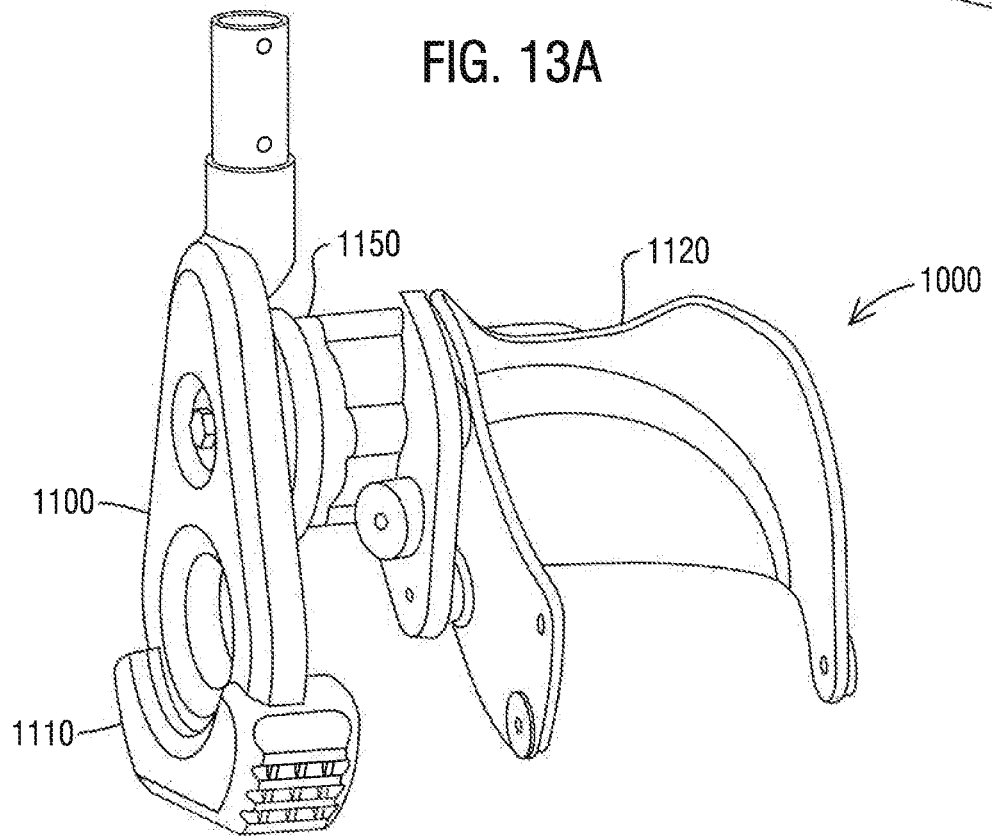
FIGS. 13A-13E show different perspective views of a foot assembly.
Figure 13B:
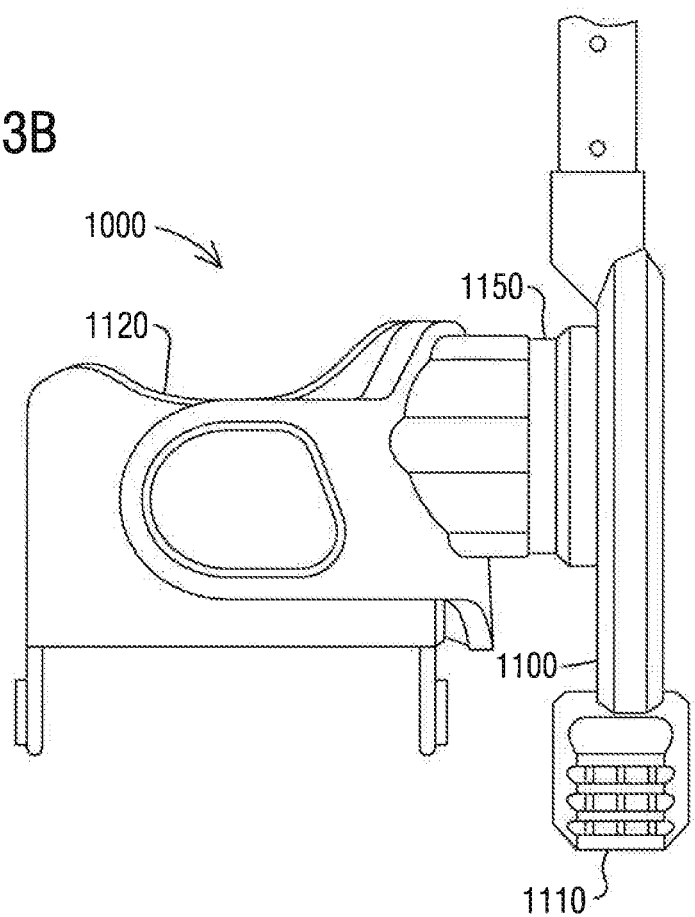
Figure 13C:
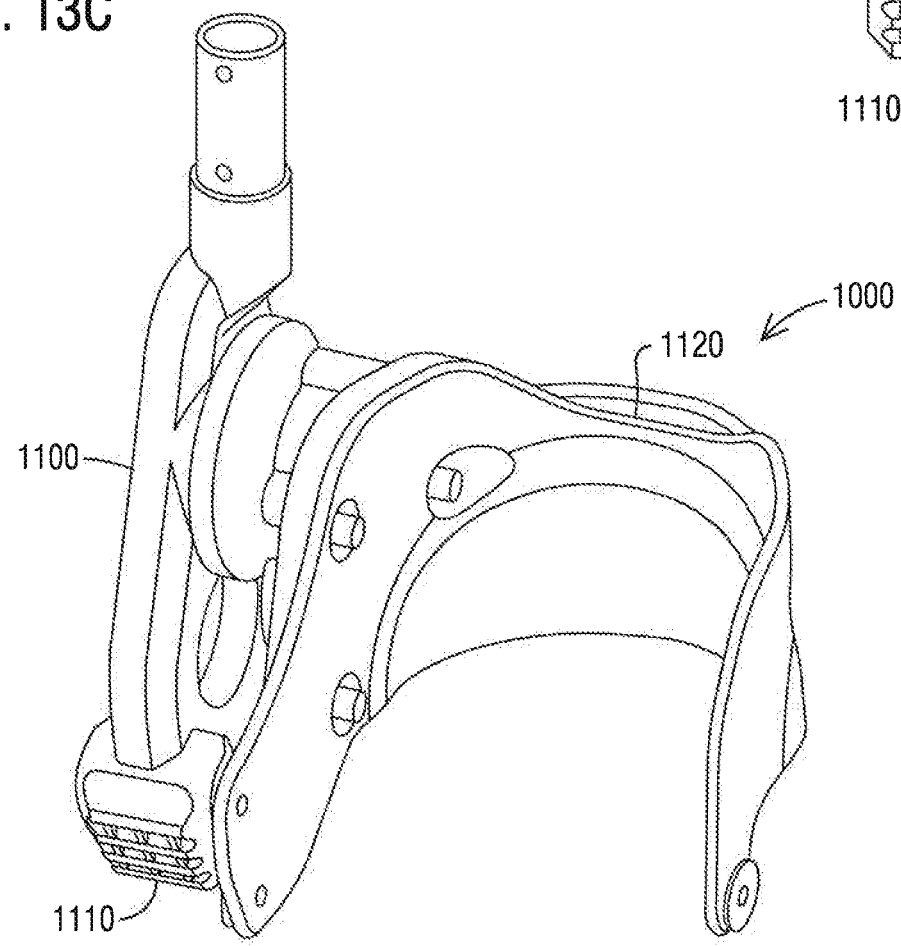
Figure 13D:
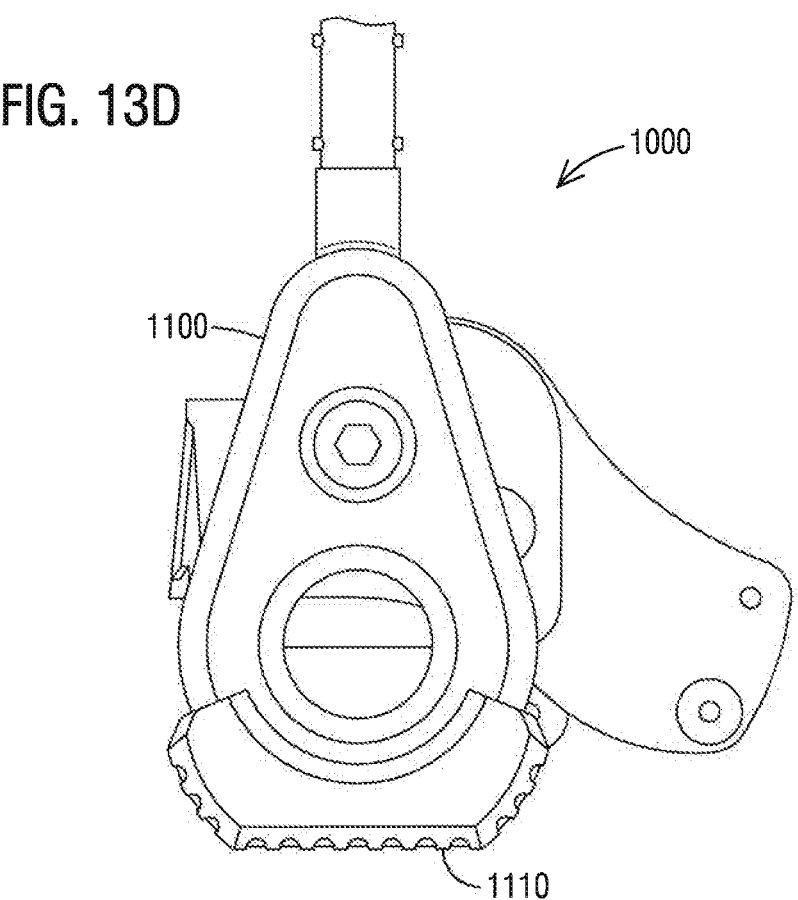
Figure 13E:
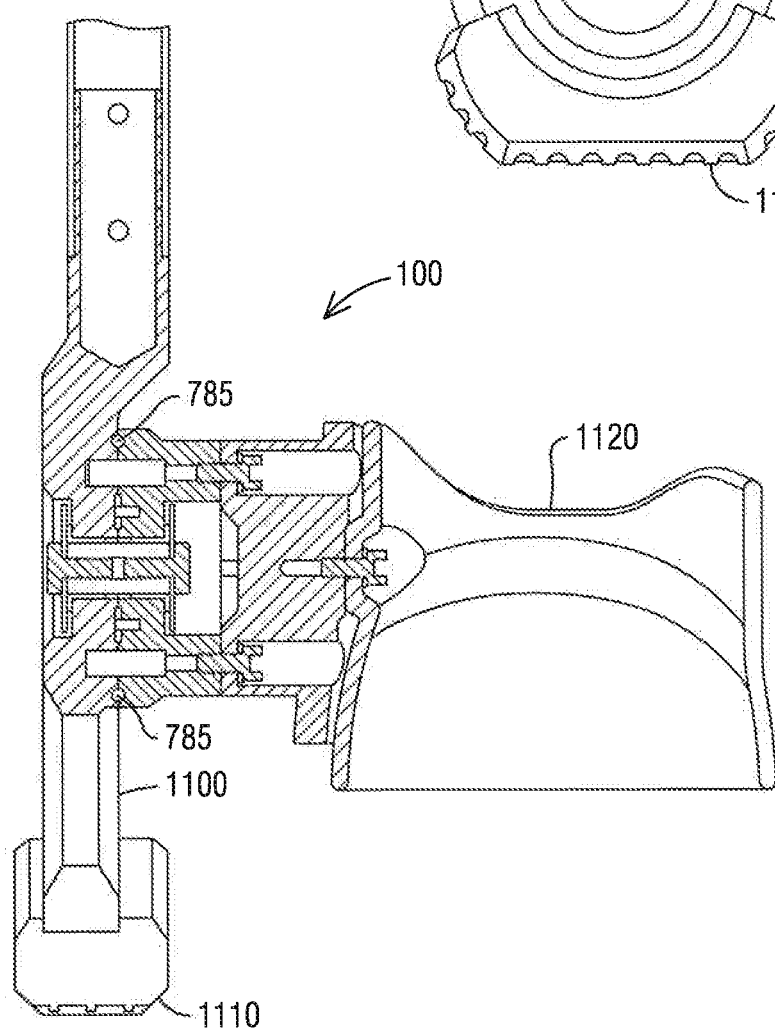

FIG. 13E shows a cross section view of the foot assembly taken from a front of the exoskeleton system. A seal 785 may be provided to make this a sealed joint. Similar to the hip joint 600 and knee joint 700 movement of the ankle joint 1150 may be limited to correspond to natural movements of the user's ankle.

As identified briefly above, to accommodate various physical shapes of users, aspects of the exoskeleton system 100 may be adjustable. The hip arc 120 may be adjustable, such as with a push-pin connection subsystem (not shown) to adjust a width between each hip arc to fit a plurality of sized users. Though adjustable, the moment arm in a sagittal plane at the hip remains the same even though the widths between the hip arcs do change. Both the height of the femur component 650 and the fibula component 900 may be adjustable to extend or retract to a length that corresponds to those particular lengths of the user so that the hip joint 600 is aligned with the hip, knee joint 700 is aligned with the knee, and the foot assembly 1100 is aligned with the ankle and foot. The location of the thigh support 800 and the calf support 950 may also be adjustable to best accommodate the user. As a non-limiting example, a push-pin connection subsystem 880 may be provided and used to make these adjustments.

FIG. 14 shows a flowchart illustrating an embodiment of a method disclosed herein. The method 1400 comprises directing a load experienced by a user above a hip of the user to a hip joint that provides for anatomically correct three degrees of freedom of the hip of the user, at 1410. The method 1400 further comprises transferring the load from the hip joint to a knee joint that provides anatomically correct forward and backward movement at a knee location of the user, at 1420. If the user places a bended knee on a ground, the method 1400 further comprises transferring the load from the knee joint to a knee rocker arm that is a part of the knee joint and that extends nearly horizontally from the second joint to transfer the load to a ground surface when the knee rocker arm is in contact with the ground surface, the knee rocker arm provides a surface that allows the knee rocker arm to be displaced in a forward or backward position manually by the user, at 1430. If the user remains standing, the method 1400 further comprises transferring the load from the knee joint to a foot assembly having a ground rocker arm that is separate and apart from a base of a foot of the user, the ground rock arm provides a surface in contact with the ground that allows the ground rocker arm to be displaced in forward and backward position manually by the user, at 1440.

The method 1400 may further comprise transferring the load from the hip joint to the knee joint with a femur component in communication with and located between the hip joint and the knee joint, at 1425. The method 1400 may further comprise transferring the load from the knee joint to the foot assembly with a fibula component in communication with and located between the knee joint and the foot assembly, at 1445.

Figure 15:
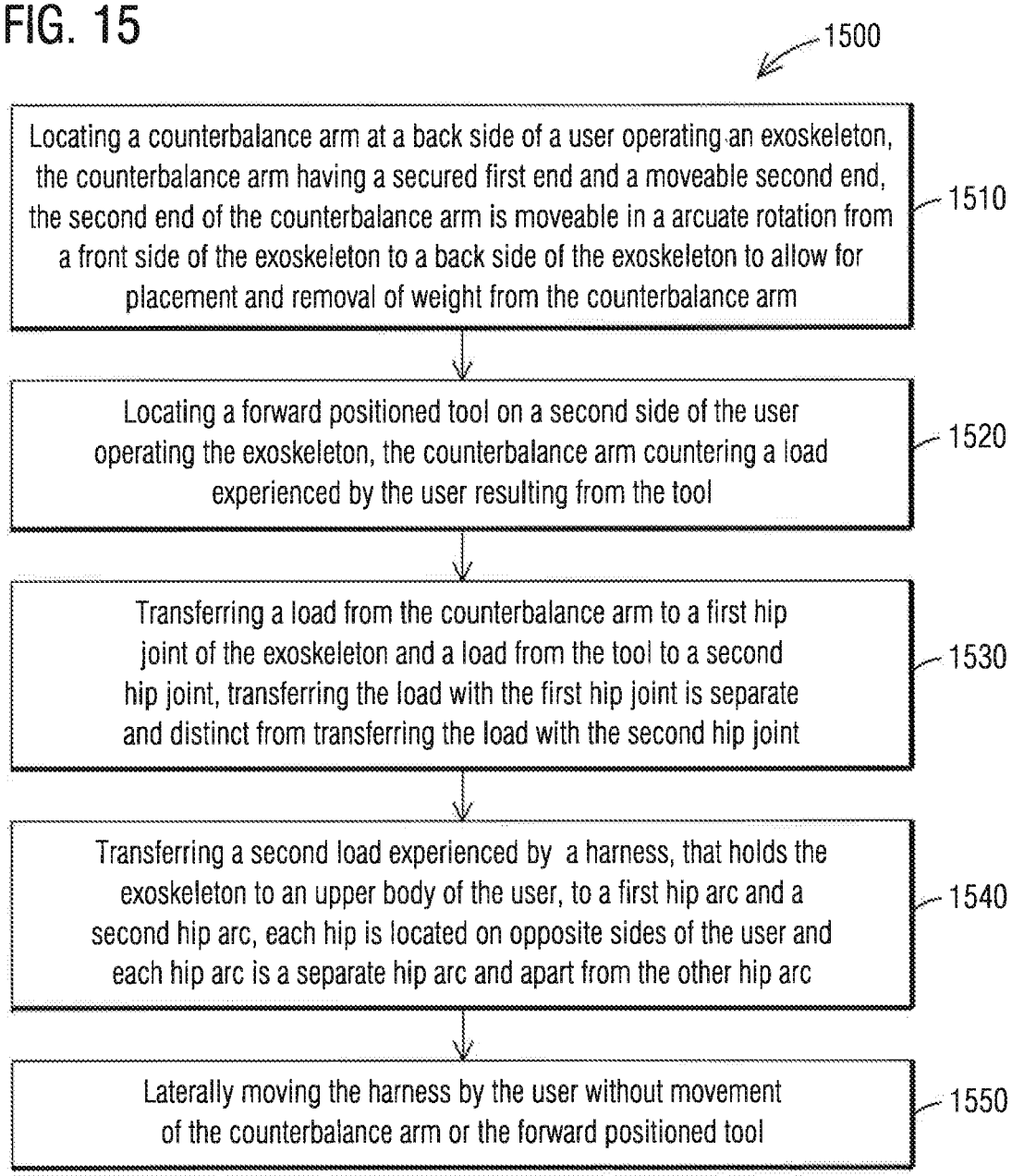
FIG. 15 shows a flowchart illustrating an embodiment of another method disclosed herein.

FIG. 15 shows a flowchart illustrating an embodiment of another method disclosed herein. The method 1500 comprises locating a counterbalance arm at a back side of a user operating an exoskeleton, the counterbalance arm having a secured first end and a moveable second end, the second end of counterbalance arm is moveable in an arcuate rotation from a front side of the exoskeleton to a back side of the exoskeleton to allow for placement and removal of weight from the counterbalance arm, at 1510. The method 1500 further comprises locating a forward positioned tool on a second side of the user operating the exoskeleton, the counterbalance arm countering a load experienced by the user resulting from the tool, at 1520. The method 1500 further comprises transferring a load from the counterbalance arm to a fast hip joint of the exoskeleton and a load from the tool to a second hip joint, transferring the load with the first hip joint is separate and distinct from transferring the load with the second hip joint, at 1530.

The method may further comprise transferring a second load experienced by a harness, that holds the exoskeleton to an upper body of the user, to a first hip arc and a second hip arc, each hip is located on opposite sides of the user and each hip arc is a separate hip arc and apart from the other hip are, at 1540. The method 1500 may also comprise laterally moving the harness by the user without movement of the counterbalance arm or the forward positioned tool, at 1550.

Figure 16:
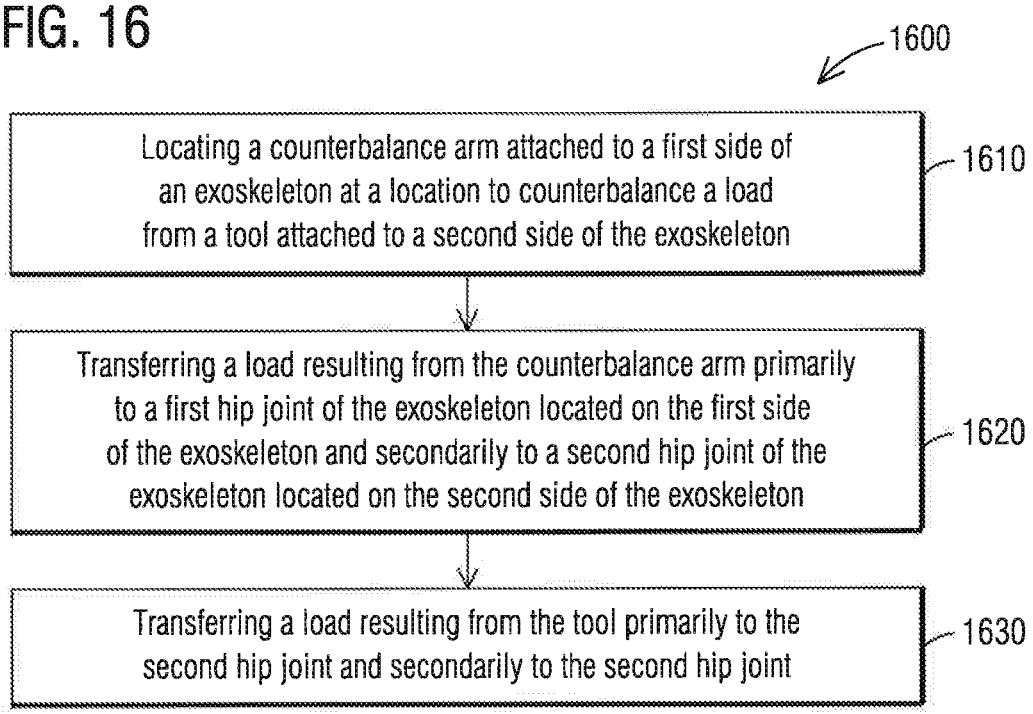
FIG. 16 shows a flowchart illustrating an embodiment of another method disclosed herein.

FIG. 16 shows another flowchart illustrating an embodiment of a method. The method 1600 comprises locating a counterbalance arm attached to a first side of an exoskeleton at a location to counterbalance, or offset, a load from a tool attached to a second side of the exoskeleton, at 1610. The method 1600 also comprises transferring a load resulting from the counterbalance arm primarily to a first hip joint of the exoskeleton located on the first side of the exoskeleton and secondarily to a second hip joint of the exoskeleton located on the second side of the exoskeleton, at 1620. The method also comprises transferring a load resulting from the tool primarily to the second hip joint and secondarily to the second hip joint, at 1630.

As used herein, primarily and predominantly identifies where most or a significant amount of the load may be transferred. However, as disclosed herein, both hip joints assist in transferring the load, though depending on a location of the load, one hip joint may transfer more of the load than the other, or second hip joint.

Figure 17:
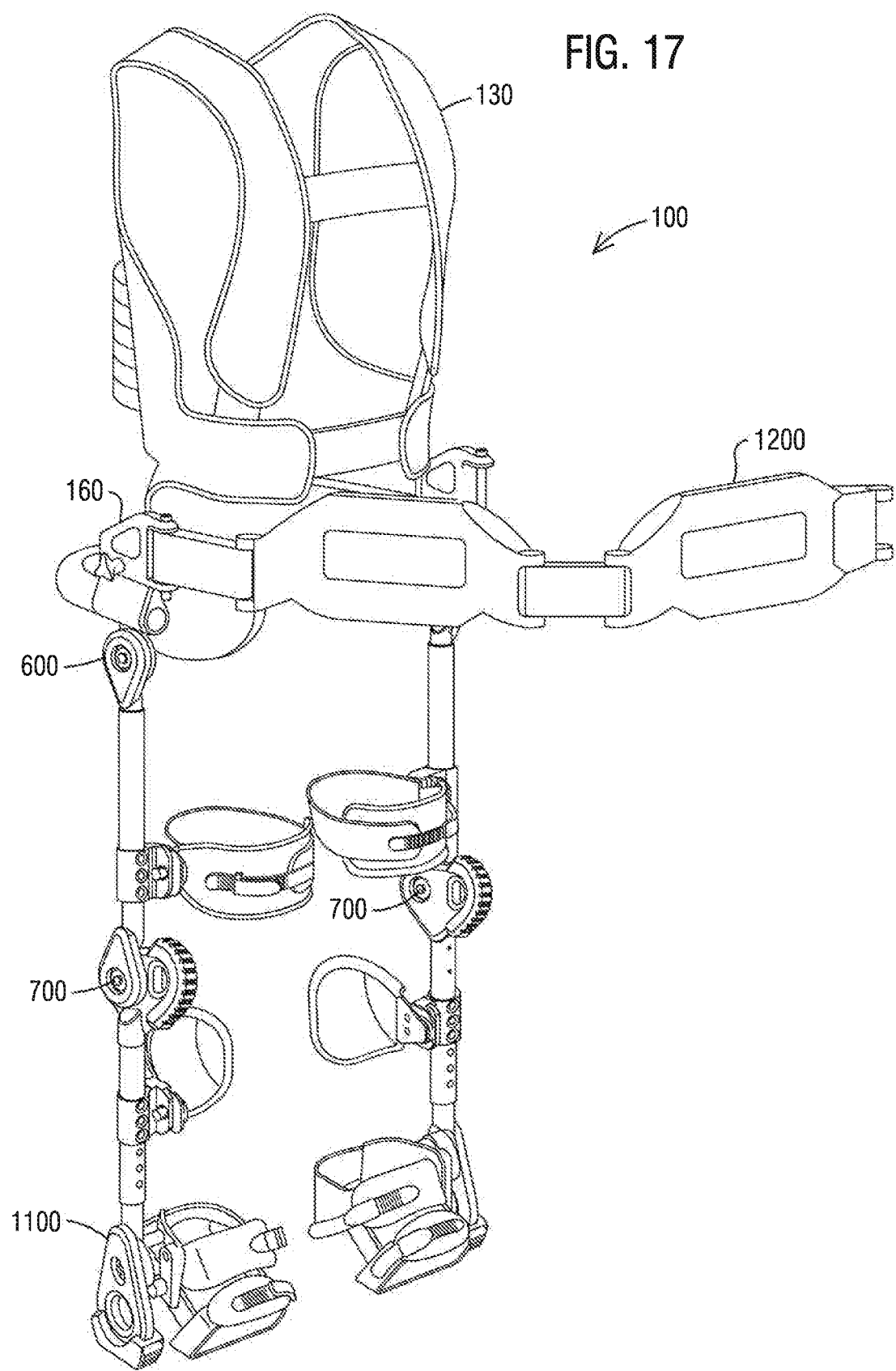
FIG. 17 shows a view of a piece of equipment attached to the tool holder.

FIG. 17 illustrates a perspective view of a piece of equipment attached to the exoskeleton system. As illustrated, and as a non-limiting example, the tool 1200 may be an arm. The type of tool used is not limited. Other non-limiting example may include a weapon, a drill, a paint gun, etc. The tool may be attached to the exoskeleton system 100 through the tool attachment 160, interface, or holder.

As further illustrated in the various figures, the exoskeleton system 100 is configured to be uniform on each side when worn by the user. Thus, a tool interface 160, and the associated components to connect the tool interface 160, may be provided on each side of the exoskeleton system 100. The hip arc 120 may extend uniformly from the torso assembly to each side.

FIG. 18 shows an embodiment of the system disclosed herein in use. A lower portion, or load transfer part of the exoskeleton system may have a first hip joint 600 and a second hip joint. Each hip joint anatomically emulates three degrees of freedom of movement of each hip or leg of the user. A first knee joint 700 and a second knee joint are provided where each anatomically emulates extension and flexion movement of each knee of the user. A first ankle joint 1000 and a second ankle joint are provided and each anatomically emulates forward and backward movement of each ankle of the user. At least one knee rocker arm 715 may be as part of either the first knee joint 700 or the second knee joint 700. The knee rocker arm 715 transfers a load to a ground surface when the at least one knee rocker arm is in contact with the ground surface as manually positioned or powered by the user.

At least one ground rocker arm 1110 is included as part of either the first ankle joint 1100 or the second ankle joint 1100. The ground rocker arm 1110 transfers the load to the ground when the at least one ground rocker arm is in contact with the ground as manually positioned or powered by the user. A harness 130 is provided to hold the exoskeleton system 100 to an upper body of the user. The harness comprises a first connector 135 and a second connector 137. A first hip arc 120 and a second hip arc 120 are provided where a first end of each respect hip arc 120 terminates at the hip joint 600 on that side of the exoskeleton and a second end that terminates at a respective connector of the harness. In another embodiment, the hip arcs 120 are connected to where it may be considered a continual hip arc that extends from a first side of the user to the opposite other side. The connectors 420 on the harness may separate the hip arcs when separate hip arcs are used, or further support the continual hip arc. When two hip arcs are provided, the first hip arc and the second hip arc are separate and apart from each other.

The load transfer part of the exoskeleton may comprise a first tool interface 710 located above the first hip joint 600 to direct load displacement through the first hip joint 600, and a second tool interface located above the second hip joint to direct load displacement through the second hip joint when the arm 1200 or a tool 1210 is attached. Though the tool 1210 is shown as being attached to the arm 1200, in other embodiments, the tool 1210 may be of a type that is attached directly to the tool connector 160. In another embodiment, the tool 1210 may be of a configuration to attach directly to the interface 710.

The load transfer feature may also comprise a counterbalance arm 560 having a first end and a second end, the counterbalance arm 560 is secured to the connector 160, that is attached to the first tool interface 710 at the first end, the second end of counterbalance arm is moveable in an arcuate rotation from in front of the tool interface to behind the tool interface.

The various structures disclosed above may be made of a rigid aluminum to provide a structure that supports the load to the ground. Attached to each rocker arm may be a rubber covering which may be configured to provide a soft surface to impact the ground and to provide for traction, such as when the ground or ground surface is wet.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A counterbalance system for an exoskeleton comprising:
   a counterbalance arm having a first end, a second end, and at least one receiver proximate the second end, the counterbalance arm configured to be secured to the exoskeleton at the first end, the second end of the counterbalance arm configured to be moveable in an arcuate rotational path ranging from in front of the exoskeleton to behind the exoskeleton, and the at least one receiver configured to attach to a counterbalance weight;
   a first hip joint to displace an external load experienced by a user above a waist of the user, the first hip joint providing for three degrees of freedom of movement; and
   a first tool interface located above the first hip joint to direct load displacement through the first hip joint, the counterbalance arm attached to the first hip joint.

2. The counterbalance system according to claim 1, further comprising the counterbalance weight attached to the at least one receiver.

3. The counterbalance system according to claim 1, wherein the counterbalance arm is manually moveable to allow placement of the counterbalance arm at a desired location along the arcuate rotational path of the counterbalance arm.

4. The counterbalance system according to claim 1, wherein the counterbalance arm further comprises an extension element to adjust a distance of the counterbalance weight from the user.

5. The counterbalance system according to claim 1, further comprising a second hip joint located on an opposite side of the user of the exoskeleton with a second tool interface to receive a tool, wherein the counterbalance arm offsets a load resulting from the tool.

6. The counterbalance system according to claim 5, further comprising a hip arc with a first end that terminates at the first hip joint and a second end that terminates at the second hip joint.

7. The counterbalance system according to claim 1, further comprising a harness with a connector and a hip arc with a first end that terminates at the first hip joint and a second end that terminates at the connector on the harness.

8. An exoskeleton system comprising:
   a first hip joint, providing for three degrees of freedom, to displace a first external load predominantly experienced above the first hip joint on a side of an exoskeleton that the first hip joint is located;
   a second hip joint, providing for three degrees of freedom, to displace a second external load predominately experienced above the second hip joint on a side of the exoskeleton that the second hip joint is located;
a first tool interface located above the first hip joint to direct load displacement through the first hip joint;
a second tool interface located above the second hip joint to direct load displacement through the second hip joint when a tool is attached; and
a counterbalance arm having a first end and a second end, the counterbalance arm attached to the first tool interface at the first end, and the second end of counterbalance arm is moveable in an arcuate rotational path from in front of the first tool interface to behind the first tool interface.

9. The exoskeleton system according to claim 8, further comprising the tool attached to the second tool interface, wherein placement of the counterbalance arm offsets displacement produced by the tool.

10. The exoskeleton system according to claim 8, further comprising at least one receiver to attach a counterbalance weight.

11. The exoskeleton system according to claim 10, further comprising the counterbalance weight.

12. The exoskeleton system according to claim 8, wherein the counterbalance arm is manually moveable to allow placement of the counterbalance arm at a desired location along the arcuate rotational path of the counterbalance arm.

13. The exoskeleton system according to claim 8, further comprising a harness to hold the exoskeleton to an upper body of a user, the harness comprising a first connector and a second connector.

14. The exoskeleton system according to claim 13, further comprising a first hip arc and a second hip arc, the first hip arc having a first end that terminates at the first hip joint and a second end that terminates at the first connector on the harness, the second hip arc having a first end that terminates at the second hip joint and a second end that terminates at the second connector on the harness, wherein the first hip arc and the second hip arc are separate and apart from each other.

15. The exoskeleton system according to claim 8, further comprising a hip arc having a first end that terminates at the first hip joint and a second end that terminates at the second hip joint.

16. The exoskeleton system according to claim 8, wherein at least one of the first tool interface and the second tool interface comprises a quick release connector for attaching at least one of the tool and the counterbalance arm.

17. The exoskeleton system according to claim 13, further comprising an articulation connector located between the first connector and the second connector of the harness to provide for rotation of the upper body of the user when within the harness without movement of at least one of the first or second tool interface.

18. The exoskeleton system according to claim 8, wherein when the first hip joint fails to displace all of the first external load, a remainder of the first external load is displaced by the second hip joint, and wherein when the second hip joint fails to displace all of the second external load, a remainder of the second external load is displaced by the first hip joint.

* * * * *